US011942317B2

(12) United States Patent
Clemmer et al.

(10) Patent No.: US 11,942,317 B2
(45) Date of Patent: Mar. 26, 2024

(54) IDENTIFICATION OF SAMPLE SUBSPECIES BASED ON PARTICLE MASS AND CHARGE OVER A RANGE OF SAMPLE TEMPERATURES

(71) Applicant: THE TRUSTEES OF INDIANA UNIVERSITY, Bloomington, IN (US)

(72) Inventors: David E. Clemmer, Bloomington, IN (US); Martin F. Jarrold, Bloomington, IN (US); Tarick J. El-Baba, Bloomington, IN (US); Corinne A. Lutomski, Bloomington, IN (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 365 days.

(21) Appl. No.: 17/602,000

(22) PCT Filed: Apr. 22, 2020

(86) PCT No.: PCT/US2020/029287
§ 371 (c)(1),
(2) Date: Oct. 7, 2021

(87) PCT Pub. No.: WO2020/219527
PCT Pub. Date: Oct. 29, 2020

(65) Prior Publication Data

US 2022/0216047 A1 Jul. 7, 2022

Related U.S. Application Data

(60) Provisional application No. 62/950,103, filed on Dec. 18, 2019, provisional application No. 62/839,080,
(Continued)

(51) Int. Cl.
*H01J 49/16* (2006.01)
*H01J 49/00* (2006.01)
(Continued)

(52) U.S. Cl.
CPC ........ *H01J 49/165* (2013.01); *H01J 49/0031* (2013.01); *H01J 49/0468* (2013.01); *H01J 49/26* (2013.01)

(58) Field of Classification Search
CPC .. H01J 49/165; H01J 49/0031; H01J 49/0468; H01J 49/26
(Continued)

(56) References Cited

U.S. PATENT DOCUMENTS 3,019,168 A 1/1962 Taylor
5,285,063 A 2/1994 Schwartz et al.
(Continued)

FOREIGN PATENT DOCUMENTS

JP 11144675 5/1999
JP 2008186730 A 8/2008
(Continued)

OTHER PUBLICATIONS

Japanese Office Action dated Jan. 24, 2023 for co-pending application 2021-527871—4 pages (Prior art reference Alexander Makarov has been previously submitted).
(Continued)

*Primary Examiner* — Nicole M Ippolito
(74) *Attorney, Agent, or Firm* — Barnes & Thornburg LLP

(57) ABSTRACT

A method for analyzing charged particles may include generating, in or into an ion source region, charged particles from a sample of particles, causing the charged particles to enter a mass spectrometer from the ion source region at each of a plurality of differing physical and/or chemical conditions in a range of physical and/or chemical conditions in which the sample particles undergo structural changes, controlling the mass spectrometer to measure at least the charge magnitudes of the generated charged particles at each of the
(Continued)

plurality of differing physical and/or chemical conditions, determining, with a processor, an average charge magnitude of the generated charged particles at each of the plurality of differing physical and/or chemical conditions based on the measured charge magnitudes, and determining, with the processor, an average charge magnitude profile over the range of physical and/or chemical conditions based on the determined average charge magnitudes.

20 Claims, 11 Drawing Sheets

Related U.S. Application Data filed on Apr. 26, 2019, provisional application No. 62/837,373, filed on Apr. 23, 2019.

(51) Int. Cl.
*H01J 49/04* (2006.01)
*H01J 49/26* (2006.01)

(58) Field of Classification Search
USPC .................................................. 250/281, 282
See application file for complete search history.

(56) References Cited

U.S. PATENT DOCUMENTS

| | | | |
|---|---|---|---|
| 5,478,745 | A | 12/1995 | Samulski |
| 5,572,025 | A | 11/1996 | Cotter |
| 5,770,857 | A | 6/1998 | Fuerstenau et al. |
| 5,863,541 | A | 1/1999 | Samulski et al. |
| 5,869,248 | A | 2/1999 | Yuan et al. |
| 5,877,022 | A | 3/1999 | Stinchcomb et al. |
| 5,880,466 | A | 3/1999 | Benner |
| 5,882,652 | A | 3/1999 | Valdes et al. |
| 5,886,346 | A | 3/1999 | Makarov |
| 5,905,040 | A | 5/1999 | Mazzara et al. |
| 5,916,563 | A | 6/1999 | Young et al. |
| 5,965,358 | A | 10/1999 | Carrion et al. |
| 6,013,487 | A | 1/2000 | Mitchell |
| 6,083,702 | A | 7/2000 | Mitchell et al. |
| 6,156,303 | A | 12/2000 | Russell et al. |
| 6,183,950 | B1 | 2/2001 | Madonna |
| 6,583,408 | B2 | 6/2003 | Smith et al. |
| 6,744,042 | B2 | 6/2004 | Zajfman et al. |
| 6,753,523 | B1 | 6/2004 | Whitehouse |
| 6,888,130 | B1 | 5/2005 | Gonin |
| 7,314,912 | B1 | 1/2008 | Hallek et al. |
| 7,829,842 | B2 | 11/2010 | Makarov |
| 8,294,085 | B2 | 10/2012 | Ding |
| 8,395,112 | B1 | 3/2013 | Bier |
| 8,409,870 | B2 | 4/2013 | Van Wuijckhuijse |
| 8,766,170 | B2 | 7/2014 | Guna et al. |
| 9,095,793 | B2 | 8/2015 | Flagan |
| 10,056,244 | B1 | 8/2018 | Quarmby et al. |
| 2002/0185606 | A1 | 12/2002 | Smith et al. |
| 2003/0155502 | A1 | 8/2003 | Grosshans et al. |
| 2004/0169137 | A1 | 9/2004 | Westphall et al. |
| 2005/0236375 | A1 | 10/2005 | Gefter et al. |
| 2007/0102634 | A1 | 5/2007 | Frey et al. |
| 2007/0254352 | A1 | 11/2007 | Schaffer et al. |
| 2009/0020694 | A1 | 1/2009 | Flory |
| 2009/0078866 | A1 | 3/2009 | Li et al. |
| 2009/0108194 | A1 | 4/2009 | Page et al. |
| 2009/0294641 | A1 | 12/2009 | Konicek et al. |
| 2009/0294655 | A1 | 12/2009 | Ding et al. |
| 2010/0084549 | A1 | 4/2010 | Ermakov et al. |
| 2010/0084552 | A1 | 4/2010 | Kawana |
| 2010/0090102 | A1 | 4/2010 | Raether et al. |
| 2010/0227310 | A1 | 9/2010 | Manalis et al. |
| 2010/0234837 | A1 | 9/2010 | Alfano |
| 2010/0314538 | A1 | 12/2010 | Makarov et al. |
| 2010/0320377 | A1 | 12/2010 | Cotter |
| 2011/0095175 | A1 | 4/2011 | Bateman |
| 2011/0240845 | A1 | 10/2011 | Ding |
| 2012/0112056 | A1 | 5/2012 | Brucker et al. |
| 2012/0282641 | A1 | 11/2012 | Reilly et al. |
| 2013/0124099 | A1 | 5/2013 | Ecker |
| 2013/0175440 | A1 | 7/2013 | Perelman et al. |
| 2013/0200261 | A1 | 8/2013 | Mizutani et al. |
| 2013/0234017 | A1* | 9/2013 | Kaltashov ............. H01J 49/167 239/690 |
| 2013/0327934 | A1 | 12/2013 | Makarov et al. |
| 2014/0197333 | A1 | 7/2014 | Jolliffe et al. |
| 2014/0346344 | A1 | 11/2014 | Chen |
| 2015/0008316 | A1 | 1/2015 | Guna |
| 2015/0021472 | A1 | 1/2015 | Makarov |
| 2015/0325425 | A1 | 11/2015 | Makarov |
| 2015/0331000 | A1 | 11/2015 | Collier et al. |
| 2016/0005580 | A1 | 1/2016 | Grinfeld |
| 2016/0035556 | A1 | 2/2016 | Berkout et al. |
| 2016/0181084 | A1 | 6/2016 | Smith |
| 2016/0336165 | A1 | 11/2016 | Guna |
| 2017/0040152 | A1 | 2/2017 | Makarov |
| 2017/0307565 | A1 | 10/2017 | Clemmer et al. |
| 2017/0372883 | A1 | 12/2017 | Verenchikov |
| 2018/0350575 | A1* | 12/2018 | Hock .................... H01J 49/004 |
| 2020/0243317 | A1 | 7/2020 | Lopez-Hilfiker et al. |
| 2020/0357626 | A1 | 11/2020 | Jarrold et al. |

FOREIGN PATENT DOCUMENTS

| | | | |
|---|---|---|---|
| JP | 2011523172 | A | 8/2011 |
| JP | 2014501429 | A | 1/2014 |
| WO | 1998011244 | A1 | 3/1998 |
| WO | 1999061601 | A1 | 12/1999 |
| WO | 2000028004 | A1 | 5/2000 |
| WO | 2000028061 | A1 | 5/2000 |
| WO | 2001092551 | A2 | 5/2001 |
| WO | 2003042704 | A1 | 5/2003 |
| WO | 2006130474 | A2 | 12/2006 |
| WO | 2010135830 | A1 | 12/2010 |
| WO | 2012080352 | A1 | 6/2012 |
| WO | 2012083031 | A1 | 6/2012 |
| WO | 2012145037 | A1 | 10/2012 |
| WO | 2016073850 | A1 | 5/2016 |
| WO | 2017162779 | A1 | 9/2017 |
| WO | 2017190031 | A1 | 11/2017 |
| WO | 2019/118242 | A1 | 6/2019 |
| WO | 2019140233 | A1 | 7/2019 |
| WO | 2019231854 | A1 | 12/2019 |

OTHER PUBLICATIONS

Japanese Office Action dated Feb. 17, 2023 for application 2020-568389—11 pages.

European Office Action dated Mar. 3, 2023 for application 19732193.8—14 pages.

PCT International Search Report and Written Opinion completed by the ISA/US dated Oct. 11, 2021 and issued in connection with PCT/US2021/034480.

Fernandez-Maestre et al. “Ammonia as a Modifier in Ion Mobility Spectrometry: Effects on Ion Mobilities and Potential as a Separation Tool”, J. Chil. Chem. Soc. 2014. 59, No. 1, especially: abstract; p. 2398, col. 1, para 1; p. 2398, col. 1, para 2; p. 2398, col. 2, para 2; p. 2399, Figure 1; p. 2402, col. 1, para 1; p. 2402, col. 2, para 1; Figure 6a. Figure 6b.

Kafle et al. “Understanding gas phase modifier interactions in rapid analysis by Differential Mobility-Tandem Mass Spectrometry”, J Am Soc Mass Spectrom. 2014. 25(7): pp. 1098-1113, especially: p. 7, para 2; p. 10, para 5; p. 11, para 1.

Kiss et al. “Size, weight and position: ion mobility spectrometry and imaging MS combined”, Anal Bioanal Chem. 2011. 399: pp. 2623-2634, especially: p. 2626, col. 1, para 1.

PCT International Search Report and Written Opinion completed by the ISA/US dated Jan. 12, 2016 and issued in connection with PCT/US2015/059463.

(56) References Cited

OTHER PUBLICATIONS

PCT International Search Report and Written Opinion completed by the ISA/US dated Jun. 19, 2017 and issued in connection with PCT/US2017/030163.
PCT International Search Report and Written Opinion completed by the ISA/EP dated Feb. 14, 2019 and issued in connection with PCT/US2018/051944.
PCT International Search Report and Written Opinion completed by the ISA/EP dated Apr. 18, 2019 and issued in connection with PCT/US2019/013251.
PCT International Search Report and Written Opinion completed by the ISA/EP dated Apr. 16, 2019 and issued in connection with PCT/US2019/013274.
PCT International Search Report and Written Opinion completed by the ISA/EP dated Mar. 27, 2019 and issued in connection with PCT/US2019/013277.
PCT International Search Report and Written Opinion completed by the ISA/EP dated Jul. 24, 2019 and issued in connection with PCT/US2019/013278.
PCT International Search Report and Written Opinion completed by the ISA/EP dated Sep. 9, 2019 and issued in connection with PCT/US2019/013279.
PCT International Search Report and Written Opinion completed by the ISA/EP dated Mar. 28, 2019 and issued in connection with PCT/US2019/013280.
PCT International Search Report and Written Opinion completed by the ISA/EP dated Aug. 27, 2019 and issued in connection with PCT/US2019/013281.
PCT International Search Report and Written Opinion completed by the ISA/EP dated Mar. 27, 2019 and issued in connection with PCT/US2019/013283.
PCT International Search Report and Written Opinion completed by the ISA/EP dated Mar. 29, 2019 and issued in connection with PCT/US2019/013284.
PCT International Search Report and Written Opinion completed by the ISA/EP dated Jul. 26, 2019 and issued in connection with PCT/US2019/013285.
PCT International Search Report and Written Opinion completed by the ISA/EP dated Aug. 27, 2019 and issued in connection with PCT/US2019/035381.
PCT International Search Report and Written Opinion completed by the ISA/EP dated Sep. 9, 2019 and issued in connection with PCT/US2019/035379.
PCT International Search Report and Written Opinion completed by the ISA/EP dated Mar. 8, 2021 and issued in connection with PCT/US2020/065300.
PCT International Search Report and Written Opinion completed by the ISA/EP dated Mar. 8, 2021 and issued in connection with PCT/US2020/065301.
PCT International Search Report and Written Opinion completed by the ISA/US dated Apr. 5, 2021 and issued in connection with PCT/US2021/016435.
PCT International Search Report and Written Opinion completed by the ISA/US dated Mar. 18, 2021 and issued in connection with PCT/US2021/016325.
Supplemental European Search Report for European Patent Application No. 17790559.3 dated Nov. 12, 2019 (11 pages).
Anthony, Staci N. "MS/MS instrumentation for megadalton-sized ions", 2016, XP055619426, ISBN: 978-1-369-02558-3 Retrieved from the Internet: URL:https://search.proquest.com/docview/1830450391?accountid=29404.
Anthony, et al., A simple electrospray interface based on a DC ion carpet, Int. J. Mass Spectrom. 371, 1-7 (2014).
Bantel-Schall, U., et al., "Human Adena-Associated Virus Type 5 is Only Distantly Related to Other Known Primate Helper-Dependent Parvoviruses", Journal of Virology, vol. 73, pp. 939-947 {Feb. 1999).
Beuhler, et al., Threshold studies of secondary electron emission induced by macro ion impact on solid surfaces. Nucl. Instrum. Methods. 170, 309-315 (1980).
Beuhler, et al., A study of the formation of high molecular weight water cluster ions {m/e < 59000) in expansion of onized gas mixtures, J. Chem. Phys. 77, 2549-2557 (1982).
Brancia, et al., Digital asymmetric waveform isolation {DAWI) in a digital linear ion trap. J_ Am. Soc_ Mass Spectrom. 1. 1530-1533 (2010).
Brown, C., et al. "Chimeric Parvovirus B19 Capsids for the Presentation of Foreign Epitope",; Virology 198, pp. J77-488 (1994).
Burnham, et al. "Analytical Ultracentrifugation as an Approach to Characterize Recombinant Adena-Associated Viral Vectors", Human Gene Therapy Methods, vol. 26, No. 6; pp. 228-242, Oct. 15, 2015.
Chao, Hengjun, et al. "Several Log Increase in Therapeutic Transgene Delivery by Distinct Adena-Associated Viral Serotype Vectors" Molecular Therapy vol. 2, No. 6, pp. 619-623 {Dec. 2000).
Chiorini, John A., et al. "Cloning of Adeno-Associated Virus Type 4 (MV4) and Generation of Recombinant MV4 Particles", Journal of Virology, vol. 71, pp. 6823-6833 (Sep. 1997).
Chiorini, John A., "Cloning and Characterization of Adeno-Associated Virus Type 5", Journal of Virology, vol. 73, DP—1309-1319 (Feb. 1999).
Chernushevich, et al., Collisional cooling of large ions in electrospray mass spectrometry. Anal. Chem 76. H54-1760 (2004).
Cleves, Ann E., "Protein transport: The nonclassical ins and outs", Current Biology, vol. 7, No. 5, pp. 318-320 (1997).
Contino, Nathan Colby, "Ion trap charge detection mass spectrometry: Lowering limits of detection and improving signal to noise", ISBN: 9781303535048, Jul. 30, 2013 (Jul. 30, 2013).
Ding, et al., A simulation study of the digital ion trap mass spectrometer. Int. J. Mass Spectrom. 221, 117-138 (2002).
Ding, et al, A digital ion trap mass spectrometer coupled with atmospheric pressure ion sources. J_ Mass Spectrom. 69, 471-484 (2004).
Douglas J_ Linear quadrupoles in mass spectrometry. Mass Spectrom. Rev. 28, 937-960 (2009).
Doussineau, Tristan, et al. "Infrared multiphoton dissociation tandem charge detection-mass spectrometry of single megadalton electrosprayed ions", Review of Scientific Instruments, AIP, Melville, NY, US, vol. 82, No. 8, Aug. 1, 2011, pp. 84104-84104.
Draper, Benjamin E., "The FUNPET—a New Hybrid Ion Funnel-Ion Carpet Atmospheric Pressure Interface for the Simultaneous Transmission of a Broad Mass Range", Journal of the American Society of Mass Spectrometry 29, 2160-2172, Aug. 15, 2018.
Elliott, Andrew G., et al. "Effects of Individual Ion Energies on Charge Measurements in Fourier Transform Charge Detection Mass Spectrometry (FT-CDMS)", Journal of the American Society for Mass Spectrometry., Nov. 14, 2018 (Nov. 14, 2018).
Elliott, Andrew G., et al. "Simultaneous Measurements of Mass and Collisional Cross-Section of Single Ions with charge Detection Mass Spectrometry", Analytical Chemistry, vol. 89, No. 14, Jun. 16, 2017, pp. 7701-7708.
Elliott, Andrew G., et al. "Single Particle Analyzer of Mass: A Charge Detection Mass Spectrometer with a Multi-Detector Electrostatic Ion Trap", International Journal of Mass Spectrometry, Elsevier Science Publishers, Amsterdam, NL, vol. 414, Jan. 15, 2017, pp. 45-55.
Emerson, S., et al. "Hepatitis E Virus", Virology, vol. 2, Chapter 70; (4th ed., Lippincott-Raven Publishers).
Fields, Bernard, et al. "Parvoviridae: The Viruses and Their Replication" Virology, vol. 2, Chapter 69, pp. 2327-2359; 4th ed., Lippincott-Raven Publishers).
Fuerstenau, et al., "Mass Spectrometry of an Intact Virus", Agnew. Chem. 2001, 559-562.
Gao, Guangping, et al. "Clades of Adeno-Associated Viruses are Widely Disseminated in Human Tissues", vol. 78, pp. 6381-6388 (Jun. 2004).
Gao, Guangping, et al. "Novel Adeno-Associated Viruses from Rhesus Monkeys as Vectors for Human GeneTherap", ; National Academy of Sciences, vol. 99, No. 18, pp. 11854-11859 {Sep. 3, 2002).
Gorman, Linda, et al. "Stable Alteration of Pre-mRNA Splicing Patterns by Modified U7 Small Nuclear RNAs", National Academy of Sciences, vol. 95, No. 9, pp. 4929-4934 (Apr. 28, 1998).

(56) References Cited

OTHER PUBLICATIONS

Grifman, M., et al. "Incorporation of Tumor-Targeting Peptides into Recombinant Adeno-associated Virus Capsids",.; Molecular Therapy, vol. 3, No. 6, pp. 964-975 (Jun. 2001).
Grinfeld, Dmitry, et al. "Space-Charge Effects in an Electrostatic Multireflection Ion Trap", European Journal of Mass Spectrometry, vol. 20, No. 2, Apr. 1, 2014 (Apr. 1, 2014), p. 131-142.
Japanese Office Action dated Jan. 6, 2023 for application 2020-568366—9 pages (References 1 and 2 and the Doussineau article cited in this document have been previously submitted).
Bioconjugate Techniques; Hermanson; Academic Press, 1st Edition (1996),. (book reference, to be made available upon request).
Draper, Benjamin E., et al., "Real-Time Analysis and Signal Optimization for Charge Detection Mass Spectrometry", J. Am. Soc. Mass Spectrom. (2019) 30:898Y904.
Todd, Aaron R., et al. "Implementation of a Charge-Sensitive Amplifier without a Feedback Resistor for Charge Detection Mass Spectrometry Reduces Noise and Enables Detection of Individual Ions Carrying a Single Charge", J. Am. Soc. Mass Spectrom. 2020, 31, 146-154.
Tsao, Jun, et al., "The Three-Dimensional Structure of Canine Parvovirus and Its Functional Implications", American Association for the Advancement of Science, Science, New Series, vol. 251, No. 5000, pp. 1456-1464 {Mar. 22, 1991).
Walters, Robert W., "Structure of Adeno-Associated Virus Serotype 5", Journal of Virology, vol. 78, No. 7, pp. B361-3371 {Apr. 2004).
Wang, Lei, et al., "Expanding the Genetic Code", Annual Review of Biophysics and Biomolecular Structure, vol. 35, pp. 25-249 {2006).
Xie, Qing, et al., "Canine Parvovirus Capsid Structure, Analyzed at 2.9 A Resolution", Journal of Molecular Biology, vol. 64, pp. 497-520 (1996).
Xie, Qing, et al., "The atomic structure of adeno-associated virus (MV-2), a vector for human gene therapy", PNAS, vol. 99, No. 16, pp. 10405-10410 (Aug. 6, 2002).
Xiao, Weidong, et al., "Gene Therapy Vectors Based on Adena-Associated Virus Type 1", Journal of Virology, vol. 73, No. 5, pp. 3994-4003 (May 1999).
Jetrecht et al., "Stability and Shape of Hepatitis B Virus Capsids In Vacuo", Angew. Chem. Int. Ed. 2008, 47, 6247-6251.
Uetrecht et al., "High-resolution mass spectrometry of viral assemblies: Molecular composition and stability of dimorphic hepatitis B virus capsids", PNAS 2008, vol. 105, 9216-9920.
Winger, Brian E., et al., "Observation and Implications of High Mass-to-Charge Ratio Ions from Electrospray Ionization Mass Spectrometry," 1993 American Society for Mass Spectrometry 4, 536-545.
Xiong, et al., The development of charge detection-quadrupole ion trap mass spectrometry driven by rectangular and triangularwaves, Analyst 137, 1199-1204 (2012).
Yang, et al., Development of a palm portable mass spectrometer. J. Amer. Soc. Mass Spec. 19, 1442-1448 (2008).
Yost, et al., Selected ion fragmentation with a tandem quadrupole mass spectrometer. J. Am. Chem. Soc. 100, 274-2275 (1978).
PCT International Search Report and Written Opinion completed by the ISA/US dated Nov. 23, 2020 and issued in connection with PCT/US2020/052009.
PCT International Search Report and Written Opinion completed by the ISA/US dated Jan. 24, 2021 and issued in connection with PCT/US2020/054975.
Pierson, Elizabeth, "Charge Detection Mass Spectrometry: Instrumentation & Applications to Viruses", Proquest Dissertations and Theses; Thesis (Ph.D.) vol. 76-09(E), Section: B. 168.
Snijder, J., et al., "Defining the Stoichiometry and Cargo Load of Viral and Bacterial Nanoparticles by Orbitrap Mass Spectrometry", J. Am. Chem. Soc. 2014, 136, 7295-7299.
Weiss, Victor U., et al., "Analysis of a Common Cold Virus and Its Subviral Particles by Gas-Phase Electrophoretic Mobility Molecular Analysis and Native Mass Spectrometry", Anal Chem. 2015.
Wright, J. Fraser, "Product-Related Impurities in Clinical-Grade Recombinant AAV Vectors: Characterization and Risk Assessment", Biomedicines 2014, 2, 80-97.
Botamanenko, Daniel, et al., "Ion-Ion Interactions in Charge Detection Mass Spectrometry", J. Am. Soc. Mass Spectrom. Dec. 30, 2019(12):2741-2749. doi:10.1007/sl3361-019-02343-y.
European Office Action dated Sep. 2, 2021 for application 19 707 901.5—5 pages.
Hauck, B., et al. "Characterization of Tissue Tropism Determinants of Adeno-Associated Virus Type 1", Journal of Virology, vol. 77, No. 4, pp. 2768-2774 (Feb. 2003).
Heller, Manfred, et al. "Mass Spectrometry-Based Analytical Tools for the Molecular Protein Characterization of Human Plasma Lipoproteins", Proteomics 2005, 5, 2619-2630.
Hogan, Joanna, et al. "Optimized Electrostatic Linear Ion Trap for Charge Detection Mass Spectrometry", Jul. 9, 2018 (Jul. 9, 2018), vol. 29, No. 10, p. 2086-2095.
Hutchins, Patrick M., et al. "Quantification of HDL Particle Concentration by Calibrated Ion Mobility Analysis", Clinical Chemistry 60:11, 1393-1401, 2014.
Keifer, David Z., "Single-Molecule Mass Spectrometry", Mass Spectrometry Reviews, vol. 36 pp. 715-733 (2017).
Keifer, David et al., "Charge Detection Mass Spectrometry of Bacteriophage P22 Procapsid Distributions Above 20MDa", Rapid Communications in Mass Spectrometry, vol. 28, No. 5.
Keifer, David Z., et al. "Charge Detection Mass Spectrometry with Almost Perfect Charge Accuracy", Analytical Chemistry, vol. 87, No. 20, Oct. 20, 2015, pp. 10330-10337.
Kelly, Ryan T., et al. "The ion funnel: Theory, implementations, and applications", Mass Spectrometry Reviews., vol. 29, Apr. 23, 2009, pp. 294-312.
Kim et al., A multicapillary inlet jet disruption electrodynamic ion funnel interface for improved sensitivity using tmospheric pressure ion sources. Anal. Chem. 73, 4162-4170 (2001).
Koizumi et al., A novel phase-coherent programmable clock for high-precision arbitrary waveform generation applied to digital ion trap mass spectrometry_ Int. J_ Mass Spectrom_ 292, 23-31 (2010).
Konenkov et al., Matrix methods for the calculation of stability diagrams in quadrupole mass spectrometry. J. Amer. Soc. Mass Spec. 13, 597-613 (2002).
Kukreja, Alexander A., et al. "Structurally Similar Woodchuck and Human Hepadnavirus Core Proteins Having Distinctly Different Temperature Dependencies of Assembly" Journal of Virology, vol. 68, No. 24, 14105-14115, Sep. 24, 2014.
Landais et al., Varying the radio frequency: A new scanning mode for quadrupole analyzers. Rapid Commun. Mass Spectrom. 12, 302-306 (1998).
Makarov, Alexander, "Electrostatic Axially Harmonic Orbital Trapping: A High-Performance Technique of Mass Analysis", Analytical Chemistry, vol. 72, No. 6, Mar. 1, 2000 (Mar. 1, 2000), p. 1156-1162.
Marmet et al., A frequency-swept quadrupole mass filler. Int. J_ Mass Spectrom. Ion Proc. 42, 3-10 (1982).
Martin, Stability of doubly charged alkali halide clusters. J_ Chem. Phys. 76, 5467-5469 (1982).
Miyamura, K., et al. "Parvovirus Particles as Platforms for Protein Presentation", National Academy of Sciences, vol. 1, No. 18,pp. 8507-8511 (Aug. 30, 1994).
Mori, Seiichiro, Mori, et al. "Two novel adeno-associated viruses from cynomolgus monkey: pseudotyping characterization of capsid protein", Virology 330, pp. 375-383 (2004).
Muzyczka, N., "Use of Adeno-Associated Virus as a General Transduction Vector for Mammalian Cells", Current Topics n Microbiology and Immunology, vol. 158, pp. 97-129 (1992).
Muramatsu, S., et al. "Nucleotide Sequencing and Generation of an Infectious Clone of Adeno-Associated Virus 3", Virology vol. 221; Article No. 0367; pp. 208-217 (1996).
Nie et al., Frequency scan of a quadrupole mass analyzer in the third stability region for protein analysis. J. Chin. Chem_ Soc., 53, 47-52 (2006).
Padron, Eric, et al. "Structure of Adeno-Associated Virus Type 4", Journal of Virology, vol. 79, No. 8, pp. 5047-5058 Apr. 2005).

(56) References Cited

OTHER PUBLICATIONS

Paul et al., Das elektrische massenfilter als massenspektromeler und isotopenlrenner. Z. Phys. 152, 143-182 (1958).
Paul, et al., Das elektrische massenfiller, Z. Phys. 140, 262-273 (1955).
Pierson, Elizabeth E., et al., "Detection of 1-15 Late Intermediates in Virus Capsid Assembly by Charge Detection Mass Spectrometry", Journal of the American Chemical Society, vol. 136, No. 9, Feb. 19, 2014, 3536-3541.
Pierson, Elizabeth E., et al., Charge Detection Mass Spectrometry for Single Ions with an Uncertainty in the Charge Measurement of 0.65 e; Elizabeth E_ Pierson et al.; Journal American Society for Mass Spectrometry, vol. 26, pp. 1213-1220 (2015).
Pierson, Elizabeth E., et al. "Charge Detection Mass Spectrometry Identifies Preferred Non-icosahedral Polymorphs in the Self-Assembly of Woodchuck Hepatitis Virus Capsids", Jour. of Molecular Biology, vol. 428, Issue 2, pp. 292-300. Jan. 29, 2016.
Puttaraju, M., et al. "Spliceosome-mediated RNA trans-splicing as a tool for gene therapy", Nature Biotechnology, vol. 17, pp. 246-252 (Mar. 1999).
Richards et al., A new operating mode for the quadrupole mass filler. Int. J. Mass Spectrom. Ion Phys. 12, 317-339 1973).
Richards et al., Waveform parameter tolerances for the quadrupole mass filler with rectangular excitation. Int. J. Mass Spectrom. Ion Phys_ 15, 417-428 (1974).
Schlunegger et al., Frequency scan for the analysis of high mass ions generated by matrix-assisted laser esorption/ionization in a Paul trap_ Rapid Commun. Mass Spectrom. 13, 1792-1796 (1999).
Shade, Rosemary, et al. "Nucleotide Sequence and Genome Organization of Human Parvovirus B19 Isolated from the Serum of a Child during plastic Crisis", Journal of Virology, vol. 58, No. 3, pp. 921-936 {Jun. 1986).
Sharp, Phillip A., et al. "RNA Interference", American Association for the Advancement of Science; Science, New Series, vol. 287, No. 5462, pp. 2431-2433 {Mar. 31, 2000).
Shi, Z., et al. "Insertional Mutagenesis at Positions 520 and 584 of Adena-Associated Virus Type 2 (MV2) Capsid Gene and Generation of MV2 Vectors with Eliminated Heparin-Binding Ability and Introduced Novel Tropism", Human Gene Therapy, vol. 17, pp. 353-361 (Mar. 2006).
Shinholt, Deven L., et al., "A Frequency and Amplitude Scanned Quadrupole Mass Filter for the Analysis of High m/z Ions", Review of Scientific Instruments 85, 113109 (2014) (Received Sep. 11, 2014; accepted Oct. 17, 2014; published online Nov. 21, 2014).
Sobott et al., A tandem mass spectrometer for improved transmission and analysis of large macromolecular Assemblies. Anal. Chem. 74, 1402-1407 (2002).
Sonalikar, Hrishikesh S., et al. "Numerical analysis of segmented-electrode Orbitraps", International Journal of Mass Spectrometry, Elsevier Science Publishers, Amsterdam, NL,vol. 395, Dec. 17, 2015 (Dec. 17, 2015), p. 36-48.
Srivastava, Arun, et al., "Nucleotide Sequence and Organization of the Adena-Associated Virus 2 Genome", Journal of Virology, vol. 45, No. 2, pp. 555-564 {Feb. 1983).
Syed, et al., Quadrupole mass filler: Design and performance for operation in stability zone 3. J. Am. Soc. Mass Spectrom. 24, 1493-1500 (2013).
Japanese Office Action dated Jan. 31, 2023 for co-pending application 2020-568364—9 pages.
Japanese Office Action dated Jan. 18, 2023 for 2020-568469—16 pages (References 1, 2, 3 and 5 , and prior art document JP 2010-515210 [English equivalent US 2013/327934A1],cited in this document have been previously submitted).
Japanese Office Action dated Jan. 18, 2023 for application 2020-568379—11 pages (Prior art documents David Keifer, U.S. Pat. No. 5,880,466, U.S. Pat. No. 6,888,130 and U.S. Publication 2011/0240845 have been previously submitted).
PCT Search Report and Written Opinion completed by the ISA/EP dated Jul. 14, 2020 and issued In connection with PCT/US2020/029287.
David Z. Keifer et al, "Charge detection mass spectrometry: weighing heavier things", Analyst,vol. 142, No. 10, Apr. 26, 2017 (Apr. 26, 2017), p. 1654-1671.
Tarick J. El-Baba et al, "Melting proteins confined in nanodroplets with 10.6 [mu]m light provides clues about early steps of denaturation", Chemical Communications,vol. 54, No. 26, Mar. 8, 2018 (Mar. 8, 2018), p. 3270-3273.
Brown, Brooke Ann, et al, Charge Detection Mass Spectrometry Measurements of Exosomes and other Extracellular Particles Enriched from Bovine Milk, Analytical Chemistry, Jan. 28, 2020.
Kosaka, Nobuyoshi, et al., Versatile Roles of Extracellular Vesicles in Cancer, J Clin Invest. 2016; 126(4):1163-1172. https://doi.org/10.1172/JC181130.
Office Action and Search Report for CN patent application No. 201980051696.1, dated Sep. 25, 2023. (translation appended).

* cited by examiner

25 C

65 C

IDENTIFICATION OF SAMPLE SUBSPECIES BASED ON PARTICLE MASS AND CHARGE OVER A RANGE OF SAMPLE TEMPERATURES

CROSS-REFERENCE TO RELATED APPLICATIONS

This application is a U.S. national stage entry of PCT Application No. PCT/US2020/029287, filed Apr. 22, 2020, which claims the benefit of, and priority to, U.S. Provisional Patent Application Ser. No. 62/837,373, filed Apr. 23, 2019, U.S. Provisional Patent Application Ser. No. 62/839,080, filed Apr. 26, 2019, and U.S. Provisional Patent Application Ser. No. 62/950,103, filed Dec. 18, 2019, the disclosures of which are all expressly incorporated herein by reference in their entireties.

GOVERNMENT RIGHTS

This invention was made with government support under GM121751, and GM131100 awarded by the National Institutes of Health. The United States Government has certain rights in the invention.

TECHNICAL FIELD

The present disclosure relates generally to instruments and techniques for measuring charged sample particles, and further to such instruments and techniques for measuring charges of such particles over at least one range of differing physical and/or chemical conditions in which the sample particles undergo structural changes.

BACKGROUND

Spectrometry instruments provide for the identification of chemical components of a substance by measuring one or more molecular characteristics of the substance. Some such instruments are configured to analyze the substance in solution and others are configured to analyze charged particles of the substance in a gas phase. Molecular information produced by many such charged particle measuring instruments is limited because such instruments lack the ability to measure particle charge or to process particles based on their charge.

SUMMARY

The present disclosure may comprise one or more of the features recited in the attached claims, and/or one or more of the following features and combinations thereof. In one aspect, an instrument for analyzing charged particles may comprise an ion generator configured to generate charged particles from a sample of particles, a mass spectrometer configured to receive the charged particles generated by the ion generator and to measure masses and charge magnitudes of the generated charged particles, a thermal energy source configured to transfer thermal energy to at least one of the sample particles and the charged particles generated by the ion generator, a processor, and a memory having instructions stored therein executable by the processor to cause the processor to (a) control the thermal energy source to cause the charged particles to enter the mass spectrometer at each of a plurality of different temperatures within a range of temperatures over which the sample particles undergo structural changes, (b) control the mass spectrometer to measure at least the charge magnitudes of the generated charged particles at each of the plurality of different temperatures, (c) determine an average charge magnitude of the generated charged particles at each of the plurality of different temperatures based on the measured charge magnitudes, and (d) determine an average charge magnitude profile over the range of temperatures based on the determined average charge magnitudes.

In another aspect, an instrument for analyzing charged particles may comprise an ion generator configured to generate charged particles from a sample of particles, a mass spectrometer configured to receive the charged particles generated by the ion generator and to measure masses and charge magnitudes of the generated charged particles, a thermal energy source configured to transfer thermal energy to at least one of the sample particles and the charged particles generated by the ion generator, a processor, and a memory having instructions stored therein executable by the processor to cause the processor to (a) control the thermal energy source to cause the charged particles to enter the mass spectrometer at each of a plurality of different temperatures within a range of temperatures over which the sample particles undergo structural changes, (b) control the mass spectrometer to measure the masses and charge magnitudes of the generated charged particles at each of the plurality of different temperatures, and (c) within a selected range of the measure masses, (i) identify all charge magnitude peaks of the measured charge magnitudes at a first one of the plurality of temperatures, and (ii) identify additional charge magnitudes of the measured charge magnitudes at each of one or more additional ones of the plurality of temperatures each having a higher temperature than that of the first one of the plurality of temperatures.

In yet another aspect, an instrument for analyzing charged particles may comprise an ion generator within or coupled to an ion source region, the ion generator configured to generate charged particles from a sample of particles, a mass spectrometer coupled to the ion source region, the mass spectrometer configured to receive the charged particles generated by the ion generator and to measure masses and charge magnitudes of the generated charged particles, a first pump coupled to the ion source region and configured to control an operating pressure of the ion source region, a second pump coupled to the mass spectrometer and configured to control an operating pressure of the mass spectrometer, a processor, and a memory having instructions stored therein executable by the processor to cause the processor to (a) control at least one of the first and second pumps to cause the charged particles to enter or pass through the mass spectrometer at each of a plurality of different pressures within a range of pressures over which the sample particles undergo structural changes, (b) control the mass spectrometer to measure at least the charge magnitudes of the generated charged particles at each of the plurality of different pressures, (c) determine an average charge magnitude of the generated charged particles at each of the plurality of different pressures based on the measured charge magnitudes, and (d) determine an average charge magnitude profile over the range of pressures based on the determined average charge magnitudes.

In still another aspect, an instrument for analyzing charged particles may comprise an ion generator within or coupled to an ion source region, the ion generator configured to generate charged particles from a sample of particles, a mass spectrometer coupled to the ion source region, the mass spectrometer configured to receive the charged particles generated by the ion generator and to measure masses and charge magnitudes of the generated charged particles, a first pump coupled to the ion source region and configured to control an operating pressure of the ion source region, a second pump coupled to the mass spectrometer and configured to control an operating pressure of the mass spectrometer, a processor, and a memory having instructions stored therein executable by the processor to cause the processor to (a) control at least one of the first and second pumps to cause the charged particles to enter or pass through the mass spectrometer at each of a plurality of different pressures within a range of pressures over which the sample particles undergo structural changes, (b) control the mass spectrometer to measure the masses and charge magnitudes of the generated charged particles at each of the plurality of different pressures, and (c) within a selected range of the measure masses, (i) identify all charge magnitude peaks of the measured charge magnitudes at a first one of the plurality of pressures, and (ii) identify additional charge magnitudes of the measured charge magnitudes at each of one or more additional ones of the plurality of pressures each having one of a higher or lower pressure than that of the first one of the plurality of pressures.

In a further aspect, a method for analyzing charged particles may comprise in or into an ion source region, generating charged particles from a sample of particles, causing the charged particles to enter a mass spectrometer from the ion source region at each of a plurality of differing physical and/or chemical conditions in a range of physical and/or chemical conditions in which the sample particles undergo structural changes, controlling the mass spectrometer to measure at least the charge magnitudes of the generated charged particles at each of the plurality of differing physical and/or chemical conditions, determining, with a processor, an average charge magnitude of the generated charged particles at each of the plurality of differing physical and/or chemical conditions based on the measured charge magnitudes, and determining, with the processor, an average charge magnitude profile over the range of physical and/or chemical conditions based on the determined average charge magnitudes.

DESCRIPTION OF THE ILLUSTRATIVE EMBODIMENTS

Figure 1:
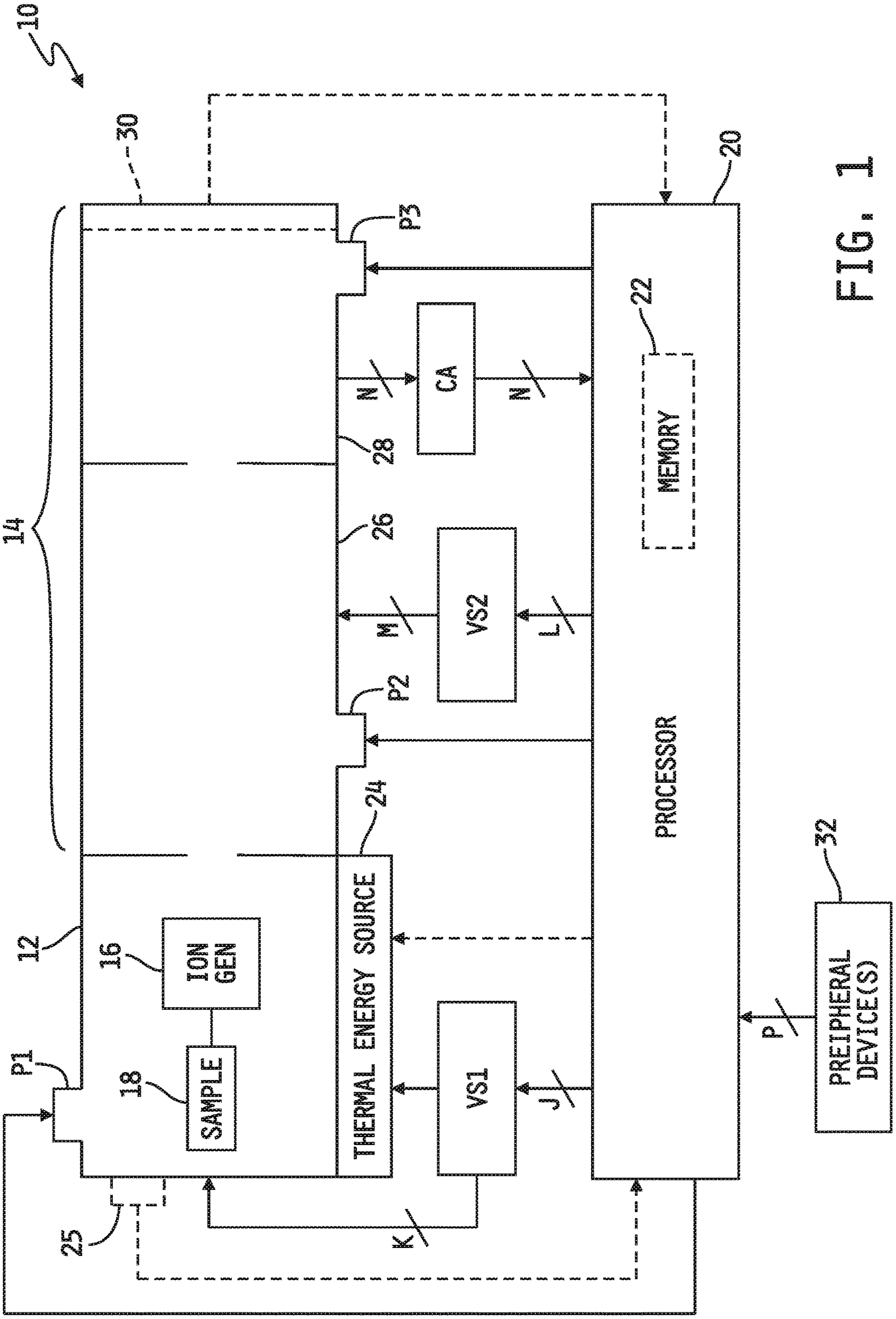
FIG. 1 is a simplified diagram of an instrument for measuring and analyzing the charge magnitudes of ionized sample particles over at least one range of differing physical and/or chemical conditions in which the sample particles undergo structural changes to identify and characterize new structural subspecies of the sample.

For the purposes of promoting an understanding of the principles of this disclosure, reference will now be made to a number of illustrative embodiments shown in the attached drawings and specific language will be used to describe the same.

This disclosure relates to apparatuses and techniques for measuring particle charges of a sample over at least one range of differing physical and/or chemical conditions in which the sample particles undergo structural changes, and for analyzing the resulting measurements to identify new structural subspecies as a function of at least particle charge. For purposes of this document, the terms “charged particle” and “ion” may be used interchangeably, and both terms are intended to refer to any particle having a net positive or negative charge. The term “charge magnitude” should be understood to mean the number of charges, i.e., the number of elemental charges “e,” of a charged particle, such that the terms “charge magnitude” and “number of charges of a charged particle” are synonymous and may be used interchangeably. A charged particle having a charge of 50 e thus has a charge magnitude of 50 e.

The phrase “at least one range of differing physical and/or chemical conditions in which the sample particles undergo structural changes” should be understood to mean any set or progression of changing physical conditions to which the sample particles are subjected before and/or after ionization thereof in or during which the sample particles undergo structural changes, any set or progression of changing chemical conditions to which the sample particles are subjected before and/or after ionization thereof in or during which the sample particles undergo structural changes, and/or any combination of one or more such sets or progressions of changing physical and/or chemical conditions in or during which the sample particles undergo structural changes. An example of such physical conditions may include, but is not limited to, sample and/or charged particle temperature, such that a range of differing physical conditions is defined by a range of differing or changing temperatures to which the sample and/or charged particles are subjected. Another example of such physical conditions may include, but is not limited to, sample and/or charged particle pressure, such that a range of differing physical conditions is defined by a range of differing or changing pressures to which the sample and/or charged particles are subjected, or the like. An example of such chemical conditions may include, but is not limited to, a sample in the form of a mixture or solution in which the content or makeup of the mixture or solution changes, such that a range of differing or changing chemical conditions of the sample mixture or solution is defined by changes in the content or makeup of the sample mixture or solution, e.g., by adding and/or removing components to/from the sample mixture or solution, by changing the relative concentrations in the sample mixture or solution of two or more of its components, etc. Another example of such chemical conditions may include, but is not limited to, a chemical reaction between two or more components of a mixture or solution following combining such components together into, or to form, the mixture or solution, such that a range of differing or changing chemical conditions of the sample mixture or solution is defined by changes in the chemical properties of a newly formed mixture or solution as the components chemically react with one another over some period of time, e.g., up to and including an equilibrium of the mixture or solution. It is to be understood that the phrase “at least one range of differing physical and/or chemical conditions in which the sample particles undergo structural changes” may be or include a single range of a differing physical condition, a single range of a differing chemical condition, two or more ranges of the same or different changing physical conditions, two or more ranges of the same or different changing chemical conditions, or any combination of the foregoing. In any case, the term “structural changes” should be understood to mean any detectable, i.e., measurable, change in the structure(s) of one or more of the sample particles. Examples of such structural changes that a sample particle may undergo may include, but are not limited to, any conformational change, dissociation of a dimer, tetramer or larger macromolecular assembly into fragments, loss of a small ligand (e.g., drug), and/or any change that results in aggregation, assembly or related phenomena. It will be further understood that the term “melting transition” will refer to a structural change that a particle undergoes at a corresponding “melting temperature” thereof, and that the term “melting profile” will refer to the behavior of one or more properties of a particle within a specified temperature range which includes, i.e., which passes through, a melting temperature thereof.

Referring now to FIG. 1, a diagram is shown of an instrument 10 for measuring and analyzing mass and charge of ionized sample particles over a at least one range of differing physical and/or chemical conditions in which the sample particles undergo structural changes to identify new structural subspecies of the sample. In the illustrated embodiment, the instrument 10 illustratively includes an ion source region 12 having an outlet coupled to an inlet of a mass spectrometer 14. The ion source region 12 illustratively includes an ion generator 16 configured to generate ions, i.e., charged particles, from a sample 18. The ion generator 16 is illustratively implemented in the form of any conventional device or apparatus for generating ions from a sample. As one illustrative example, which should not be considered to be limiting in any way, the ion generator 16 may be or include a conventional electrospray ionization (ESI) source, a matrix-assisted laser desorption ionization (MALDI) source or other conventional ion generator configured to generate ions from the sample 18. The sample from which the ions are generated may be any biological or other material, or any mixture of biological and/or non-biological components. In some embodiments, the sample 18 may be dissolved, dispersed or otherwise carried in solution, although in other embodiments the sample may not be in or part of a solution.

In the illustrated embodiment, a voltage source VS1 is electrically connected to a processor 20 via a number, J, of signal paths, where J may be any positive integer, and is further electrically connected to the ion source region 12 via a number, K, of signal paths, where K may likewise be any positive integer. In some embodiments, the voltage source VS1 may be implemented in the form of a single voltage source, and in other embodiments the voltage source VS1 may include any number of separate voltage sources. In some embodiments, the voltage source VS1 may be configured or controlled to produce and supply one or more time-invariant (i.e., DC) voltages of selectable magnitude. Alternatively or additionally, the voltage source VS1 may be configured or controlled to produce and supply one or more switchable time-invariant voltages, i.e., one or more switchable DC voltages. Alternatively or additionally, the voltage source VS1 may be configured or controllable to produce and supply one or more time-varying signals of selectable shape, duty cycle, peak magnitude and/or frequency.

The processor 20 is illustratively conventional and may include a single processing circuit or multiple processing circuits. The processor 20 illustratively includes or is coupled to a memory 22 having instructions stored therein which, when executed by the processor 20, cause the processor 20 to control the voltage source VS1 to produce one or more output voltages for selectively controlling operation of the ion generator 16. In some embodiments, the processor 20 may be implemented in the form of one or more conventional microprocessors or controllers, and in such embodiments the memory 22 may be implemented in the form of one or more conventional memory units having stored therein the instructions in a form of one or more microprocessor-executable instructions or instruction sets. In other embodiments, the processor 20 may be alternatively or additionally implemented in the form of a field programmable gate array (FPGA) or similar circuitry, and in such embodiments the memory 22 may be implemented in the form of programmable logic blocks contained in and/or outside of the FPGA within which the instructions may be programmed and stored. In still other embodiments, the processor 20 and/or memory 22 may be implemented in the form of one or more application specific integrated circuits (ASICs). Those skilled in the art will recognize other forms in which the processor 20 and/or the memory 22 may be implemented, and it will be understood that any such other forms of implementation are contemplated by, and are intended to fall within, this disclosure. In some alternative embodiments, the voltage source VS1 may itself be programmable to selectively produce one or more constant and/or time-varying output voltages.

In the illustrated embodiment, the voltage source VS1 is illustratively configured to be responsive to control signals produced by the processor 20 to produce one or more voltages to cause the ion generator 16 to generate ions from the sample 18. In some embodiments, the sample 18 is positioned within the ion source region 12, as illustrated in FIG. 1, and in other embodiments the ion source 18 is positioned outside of the ion source region 12. In one example embodiment, which should not be considered to be limiting any way, the sample 18 is provided in the form of a solution and the ion generator 16 is a conventional electrospray ionization (ESI) source configured to be responsive to one or more voltages supplied by VS1 to generate ions from the sample 18 in the form of a fine mist of charged droplets. It will be understood that ESI and MALDI, as described hereinabove, represent only two examples of myriad conventional ion generators, and that the ion generator 16 may be or include any such conventional device or apparatus for generating ions from a sample whether or not in solution.

In the illustrated embodiment, the instrument 10 includes a thermal energy source 24 is configured to selectively thermally energize, i.e., transfer thermal energy to, the sample 18 and/or to the charged particles exiting the ion generator 16 prior to entrance of the charged particles into the mass spectrometer 14. In some embodiments, examples of which will be described below, the thermal energy source 24 may not be utilized, and in such embodiments the thermal energy source 24 may be omitted. In some embodiments, the thermal energy may be in the form of heat transferred from the source 24 to the sample particles, and in other embodiments the thermal energy may be in the form of heat transferred from the sample particles to the source 24, i.e., cooling of the sample particles. In some embodiments, the source 24 may include both heating and cooling capabilities so that the sample temperature may be swept through ambient temperature from warmer to cooler or from cooler to warmer, or may be swept from any of cold to colder, colder to less cold, cold or cool to warm or hot, warm or hot to cool or cold, warm to warmer, warmer to less warm, warm to hot, hot to warm, etc. Example heat sources 24 may include, but are not limited to, conventional solution heaters and heating units, one or more sources of radiation, e.g., infrared, laser, microwave or other, at any radiation frequency, one or more heated gasses or other fluid(s) or the like, and example cooling sources 24 may include, but are not limited to, conventional solution chillers, one or more chilled gasses or other fluid(s), or the like.

In some embodiments, as illustrated by example in FIG. 1, the thermal energy source 24 is electrically connected to the voltage source VS1, and the voltage source VS1 is configured to be responsive to one or more control signals produced by the processor 20 to produce one or more corresponding voltages to control thermal energy produced by the thermal energy source 24. In alternate embodiments, the thermal energy source 24 may be configured to be responsive to control signals produced by the processor 20 to selectively produce thermal energy, and in such embodiments the thermal energy source 24 may be electrically connected directly, or via conventional circuitry, to the processor 20 as illustrated by dashed-line representation in FIG. 1. In any case, in one embodiment the thermal energy source 24 may be implemented in the form of one or more conventional heaters or heating elements and/or one or more conventional coolers or cooling elements, coupled to the sample 18, e.g., in the form of a solution, mixture or otherwise. In this embodiment, the thermal energy source 24 is responsive to one or more voltages produced by the voltage source VS1 and/or to one or more control signals produced by the processor 20, to control the temperature of the sample 18 of uncharged particles to a target temperature by heating or cooling the sample 18 to the target temperature. Charged particles generated by the ion generator 16 from the sample 18 thus enter the mass spectrometer 14 at the target temperature.

Alternatively or additionally, the thermal energy source 24 may be implemented in the form of one or more devices for thermally energizing charged particles exiting the ion generator 16 and prior to entrance into the mass spectrometer 14. In this embodiment, the thermal energy source 24 is responsive to one or more voltages produced by the voltage source VS1 and/or to one or more control signals produced by the processor 20, to control the temperature of the charged particles exiting the ion generator 16 to a target temperature by heating or cooling the charged particles prior to entry into the mass spectrometer 14. As with the sample temperature control embodiment, the charged particles generated by the ion generator 16 likewise enter the mass spectrometer 14 at the target temperature. In any case, it will be understood that the target temperature may be any temperature above or below ambient. Some examples of such a thermal energy source 24 and operation thereof for heating the ionized particles are disclosed in co-pending International Application No. PCT/US2018/064005, filed Dec. 5, 2018, the disclosure of which is incorporated herein by reference in its entirety. Those skilled in the art will recognize other structures and/or techniques for controlling the temperature of charged particles entering the mass spectrometer 14, by heating or cooling prior to or after inducing charge thereon, and it will be understood that any such other structures and/or techniques are intended to fall within the scope of this disclosure.

In some embodiments, one or more conventional sensors 25 may optionally be operatively coupled to the ion source region 12 and electrically coupled to the processor 20 as illustrated in FIG. 1 by dashed line representation. In such embodiments, the one or more sensors 25 is/are illustratively configured to provide one or more sensor signals to the processor 20 corresponding to the operating temperature of the thermal energy source 24, the temperature of the sample 18 and/or the temperature of the charged particles exiting the ion generator 16 and entering the mass spectrometer 14, or to provide one or more sensor signals to the processor 20 from which the operating temperature of the thermal energy source 24, the temperature of the sample 18 and/or the temperature of the charged particles exiting the ion generator 16 and entering the mass spectrometer 14 can be determined or estimated.

The mass spectrometer 14 illustratively includes two sections coupled together; an ion processing region 26 and an ion detection region 28. A second voltage source VS2 is electrically connected to the processor 20 via a number, L, of signal paths, where L may be any positive integer, and is further electrically connected to the ion processing region 26 via a number, M, of signal paths, where M may likewise be any positive integer. In some embodiments, the voltage source VS2 may be implemented in the form of a single voltage source, and in other embodiments the voltage source VS2 may include any number of separate voltage sources. In some embodiments, the voltage source VS2 may be configured or controlled to produce and supply one or more time-invariant (i.e., DC) voltages of selectable magnitude. Alternatively or additionally, the voltage source VS2 may be configured or controlled to produce and supply one or more switchable time-invariant voltages, i.e., one or more switchable DC voltages. Alternatively or additionally, the voltage source VS2 may be configured or controllable to produce and supply one or more time-varying signals of selectable shape, duty cycle, peak magnitude and/or frequency. As one specific example of the latter embodiment, which should not be considered to be limiting in any way, the voltage source VS2 may be configured or controllable to produce and supply one or more time-varying voltages in the form of one or more sinusoidal (or other shaped) voltages in the radio frequency (RF) range.

In some embodiments, the mass spectrometer 14 is configured to measure both mass and charge magnitudes of charged particles generated by the ion generator 16 as illustrated by example in FIG. 1. In such embodiments, the ion detection region is electrically connected to input(s) of each of a number, N, of charge detection amplifiers CA, where N may be any positive integer, and output(s) of the number, N, of charge detection amplifiers CA is/are electrically connected to the processor 20 as shown in FIG. 1. The charge amplifier(s) CA is/are each illustratively conventional and responsive to charges induced by charged particles on one or more respective charge detectors disposed in the charge detection region 28 to produce corresponding charge detection signals at the output thereof, and to supply the charge detection signals to the processor 20.

In one embodiment in which the mass spectrometer 14 is provided in the form of a mass spectrometer configured to measure both mass and charge magnitudes of charged particles generated by the ion generator 16, the mass spectrometer 14 may be implemented in the form of a charge detection mass spectrometer (CDMS), wherein the ion processing region 26 is or includes a conventional mass spectrometer or mass analyzer and the ion detection region 28 illustratively includes one or more corresponding CDMS charge detectors. In some embodiments, the one or more CDMS charge detectors may be provided in the form of one or more electrostatic linear ion traps (ELITs), and in other embodiments the one or more CDMS charge detectors may be provided in the form of at least one orbitrap. In some embodiments, the CDMS charge detector(s) may include at least one ELIT and at least one orbitrap. CDMS is illustratively a single-particle technique typically operable to measure mass and charge magnitude values of single ions, although some CDMS detectors have been designed and/or operated to measure mass and charge of more than one charged particle at a time. Some examples of CDMS instruments and/or techniques, and of CDMS charge detectors and/or techniques, which may be implemented in the mass spectrometer 14 of FIG. 1 are disclosed in co-pending International Application Nos. PCT/US2019/013251, PCT/US2019/013274, PCT/US2019/013277, PCT/US2019/013278, PCT/US2019/013280, PCT/US2019/013283, PCT/US2019/013284 and PCT/US2019/013285, all filed Jan. 11, 2019, and the disclosures of which are all incorporated herein by reference in their entireties.

In another embodiment in which the mass spectrometer is provided in the form of a mass spectrometer configured to measure both mass and charge magnitudes of charged particles generated by the ion generator 16, the mass spectrometer 14 may be implemented in the form of a mass spectrometer configured to measure mass-to-charge ratios of charged particles and further configured to simultaneously measure charge magnitudes of the charged particles. In such embodiments, the ion processing region 26 is or includes an ion acceleration region and/or a scanning mass-to-charge ratio filter, and the ion detection region 28 illustratively includes a charge detector array disposed in an electric field-free drift region or drift tube. In such embodiments, a conventional ion detector 30, e.g., a conventional microchannel plate detector or other conventional ion detector, is positioned at the outlet end of the drift region or drift tube and is electrically connected to the processor as illustrated by dashed-line representation in FIG. 1. Some example embodiments of such a mass spectrometer are disclosed in U.S. Patent Application 62,949/554, filed Dec. 18, 2019 and entitled MASS SPECTROMETER WITH CHARGE MEASUREMENT ARRANGEMENT, the disclosure of which is incorporated herein by reference in its entirety.

Regardless of the particular form in which the mass spectrometer 14 is provided, the various sections of the instrument 10 are controlled to sub-atmospheric pressure for operation thereof as is conventional. In the illustrated embodiment, for example, a so-called vacuum pump P1 is operatively coupled to the ion source region 12, another vacuum pump P2 is operatively coupled to the ion processing region 26 of the mass spectrometer 14 and yet another vacuum pump P2 is operatively coupled to the ion detection region 28 of the mass spectrometer. In the illustrated embodiment, each of the pumps P1, P2 and P3 is electrically coupled to the processor 20 such that the processor 20 is configured to control operation of each of the pumps P1, P2 and P3 and therefore independently control the pressures in each of the three respective regions 12, 26 and 28. In alternate embodiments, one or more of the pumps P1, P2 and/or P3 may be manually controlled. In still other embodiments, more or fewer pumps may be implemented to control the pressure in more or fewer respective portions of the instrument 10. In some embodiments in which the thermal energy source 24 is omitted, the sensor 25 may be provided in the form of a pressure sensor operable to provide a pressure signal to the processor 20 from which the processor 20 is operable to determine or estimate the pressure within the ion source region 12. In embodiments in which the thermal energy source 24 is included, the sensor 25 may include a temperature sensor and a pressure sensor. In any case, one or more additional pressure sensors may be operatively coupled to the ion processing region 26 and/or to the ion detection region 28 for determination by the processor 20 of the pressure(s) in this/these region(s).

In other embodiments, one or more examples of which will be described further below, the mass spectrometer 14 may be provided in the form of any conventional mass spectrometer configured to measure mass-to-charge ratios of charged particles generated by the ion generator 16. In such embodiments, the ion processing region 26 may typically be implemented in the form of a conventional ion acceleration region, the ion detection region 28 will be implemented in the form of one or more conventional drift tubes, the charge amplifier(s) CA will be omitted and the ion detector 30 or other ion detector suitably positioned in the mass spectrometer will be included.

Figure 2:
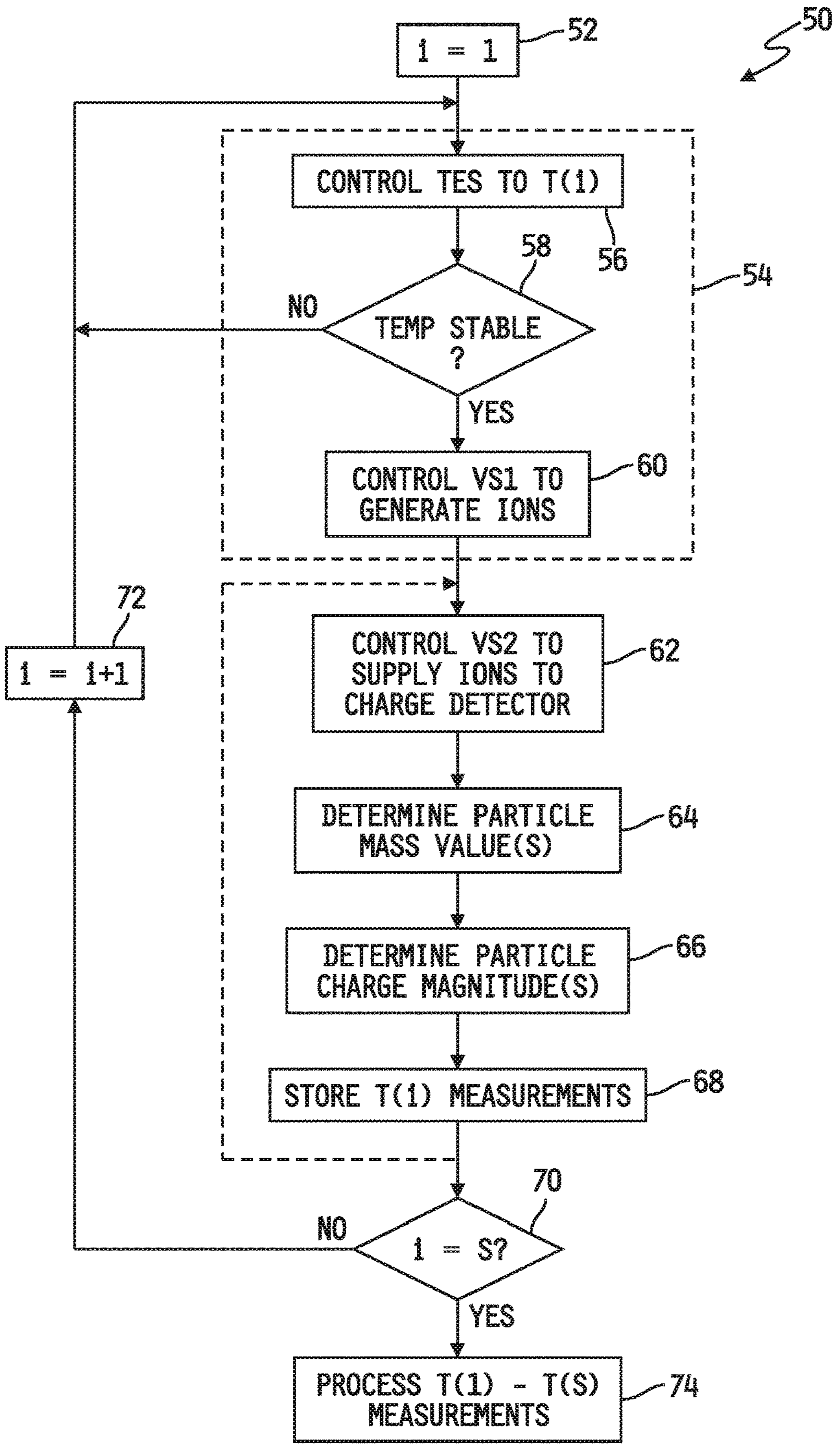
FIG. 2 is a simplified flowchart of an embodiment of an example process for controlling the instrument to measure sample particle mass and charge over a range of temperatures that spans the particle melting temperature(s).

Referring now to FIG. 2, a simplified flowchart is shown depicting an example process 50 for operating the mass spectrometer 10 of FIG. 1 to measure charge and mass of charged particles generated from a sample over a range of temperatures, and for analyzing the resulting measurements to identify new structural subspecies as a function of particle charge and/or particle mass and/or particle mass to charge-ratio. In the illustrated process 50, the range of temperatures illustratively spans the melting temperature(s) of the particles generated from the sample 18 at which the sample particles undergo respective “melting transitions” as this term is defined above. The process 50 is illustratively stored in the memory 22 in the form of instructions executable by the processor 20 to carry out the measurements and analysis. The process 50 illustratively begins at step 52 where the processor 20 is illustratively operable to set a counter i equal to 1 or to some other constant. Thereafter at step 54, the processor 20 is operable to control the voltage source VS1 to produce one or more voltages, and/or to control the thermal energy source 24 directly, to control the ion generator 16 and the thermal energy source 24 to cause the charged particles generated by the ion generator 16 to enter the mass spectrometer 14 at a target temperature T(i). In embodiments in which the thermal energy source 24 is coupled to the sample 18, e.g., in solution or otherwise, step 54 of the process 50 illustratively includes steps 56, 58 and 60 as illustrated by example in FIG. 2. In this embodiment of the process 50, the processor 20 is operable at step 56 to cause the thermal energy source 24 to control the temperature of the sample 18 to a target temperature T(i). Thereafter, the processor 20 is illustratively operable at step 58 to monitor the one or more sensors 25, in embodiments which include the one or more sensors 25, and to determine from sensor signals produced thereby, in a conventional manner, whether the operating temperature of the sample 18 has stabilized at T(i). If so, then the process 50 advances to step 60, and otherwise the process 50 loops back to step 56. In embodiments which do not include the one or more sensors 25, step 58 may illustratively be or include a selectable time delay to allow the temperature of the sample 18 to increase/decrease following execution of step 56, and in such embodiments the process 50 advances from step 58 to step 60 only after expiration of the selectable time delay. In any case, at step 60 the processor 20 is illustratively operable to control the voltage source VS1 to produce one or more voltages to control the ion generator 16 to generate charged particles from the sample 18 at the target temperature T(i). Charged particles generated from the sample 18 by the ion generator 16 thus enter the mass spectrometer 14 at the temperature T(i).

In other embodiments in which the thermal energy source 24 is configured and positioned relative to the ion source region 12 to operate on the charged particles exiting the ion generator 16, step 54 of the process 50 illustratively includes step 60 followed by step 56. The processor 20 is operable at step 60 to control the voltage source VS1 to produce one or more voltages to cause the ion generator 16 to generate charged particles, and is then operable at step 56 to control the voltage source VS1 to produce one or more voltages, and/or to control the thermal energy source 24 directly, to cause the thermal energy source 24 to control the temperature of the charged particles exiting the ion generator 16 and entering the mass spectrometer 14 to the temperature T(i). In embodiments which include the one or more sensors 25, the processor 20 may be further operable at step 56 to control the voltage source VS1 and/or the thermal energy source 24 based on feedback signal(s) produced by the one or more sensors 25. In any case, charged particles generated from the sample 18 by the ion generator 16 enter the mass spectrometer 14 at the target temperature T(i).

Following step 54, the processor 20 is illustratively operable at step 62 to control the voltage source VS2 to supply the charged particles at the target temperature T(i) exiting the ion source region 12 and entering the ion processing region 26 of the mass spectrometer 14 to the charge detection region 28 of the mass spectrometer 14. Based on the signals produced by the one or more charge amplifiers CA, and in some embodiments on signals produced by the ion detector 30 as described above, the processor 20 is operable thereafter at steps 64-68 to determine mass and charge magnitude values of the charged particles at the target temperature T(i), and to store the particle mass and charge magnitude measurements at T(i) in the memory 22. In embodiments in which the mass spectrometer 14 is a CDMS, steps 62-68 are illustratively repeated until all, or at least a desired subset, of the different charged particles generated from the sample 18 are processed.

Following step 68, the process 50 advances to step 70 where the processor 20 is operable to determine whether the current count value i has advanced to an end count value S. If not, the process 50 advances to step 72 where the count value i is incremented by 1 and the process 50 then loops back to step 54 to re-execute the process 50 at another temperature. The temperature range over which the process 50 is executed may be any temperature range in which the particles generated from the sample 18 undergo structural changes. In one example implementation of the process 50, the temperature range over which the process 50 is executed is a temperature range which spans the melting temperatures of the particles generated from the sample 18, and the total number of incremental temperatures within the selected temperature range over which the process 50 is executed may be any integer number such that the step size between incremental temperatures may be any desired step size. It will be understood that the temperature range may illustratively be advanced in the process 50 from the coolest temperature to the warmest, or vice versa, or the temperature may instead be controlled non-linearly.

As one example, which should not be considered to be limiting in any way, the temperature range over which the process 50 is executed may be 65 degrees C., which may illustratively begin at 25 degrees C. and end at 90 degrees C., with a step size of 5 degrees C. between each execution of the process 50 so that mass and charge values of the charged particles generated from the sample 18 are measured at 25 degrees C., 30 degrees C., 35 degrees C., . . . , 85 degrees C. and 90 degrees C. It will be understood that in other embodiments, the temperature range may be greater or lesser than 65 degrees C., the coolest temperature may be greater or lesser than 25 degrees C., the warmest temperature may be greater or lesser than 90 degrees C. and/or the steps size between temperatures may be greater or less than 5 degrees C.

Figure 3A:
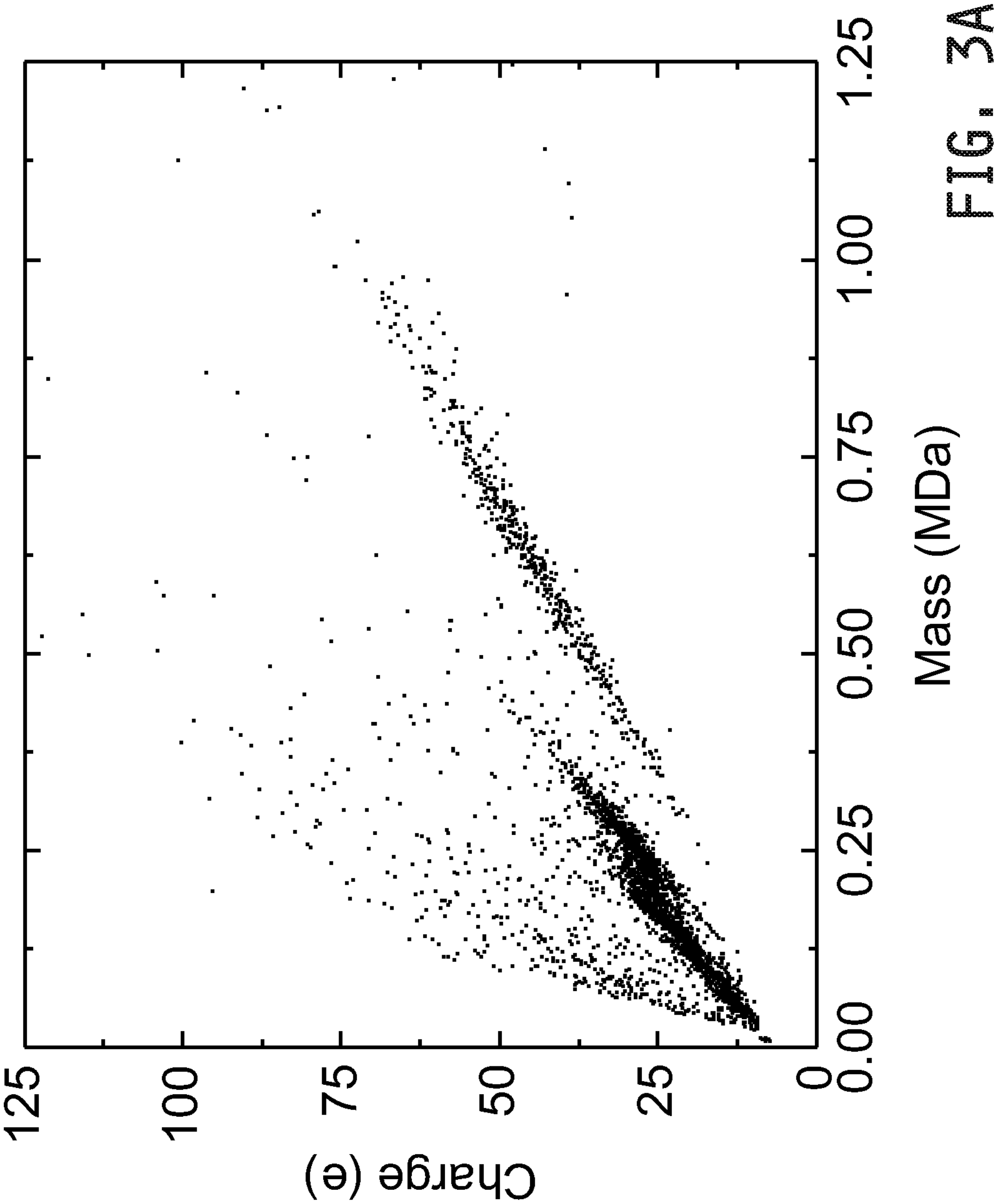
FIG. 3A is an example scatter plot of particle mass vs. particle charge for a sample of human HDL at 25 degrees C. generated according to the process illustrated in FIG. 2.
Figure 3B:
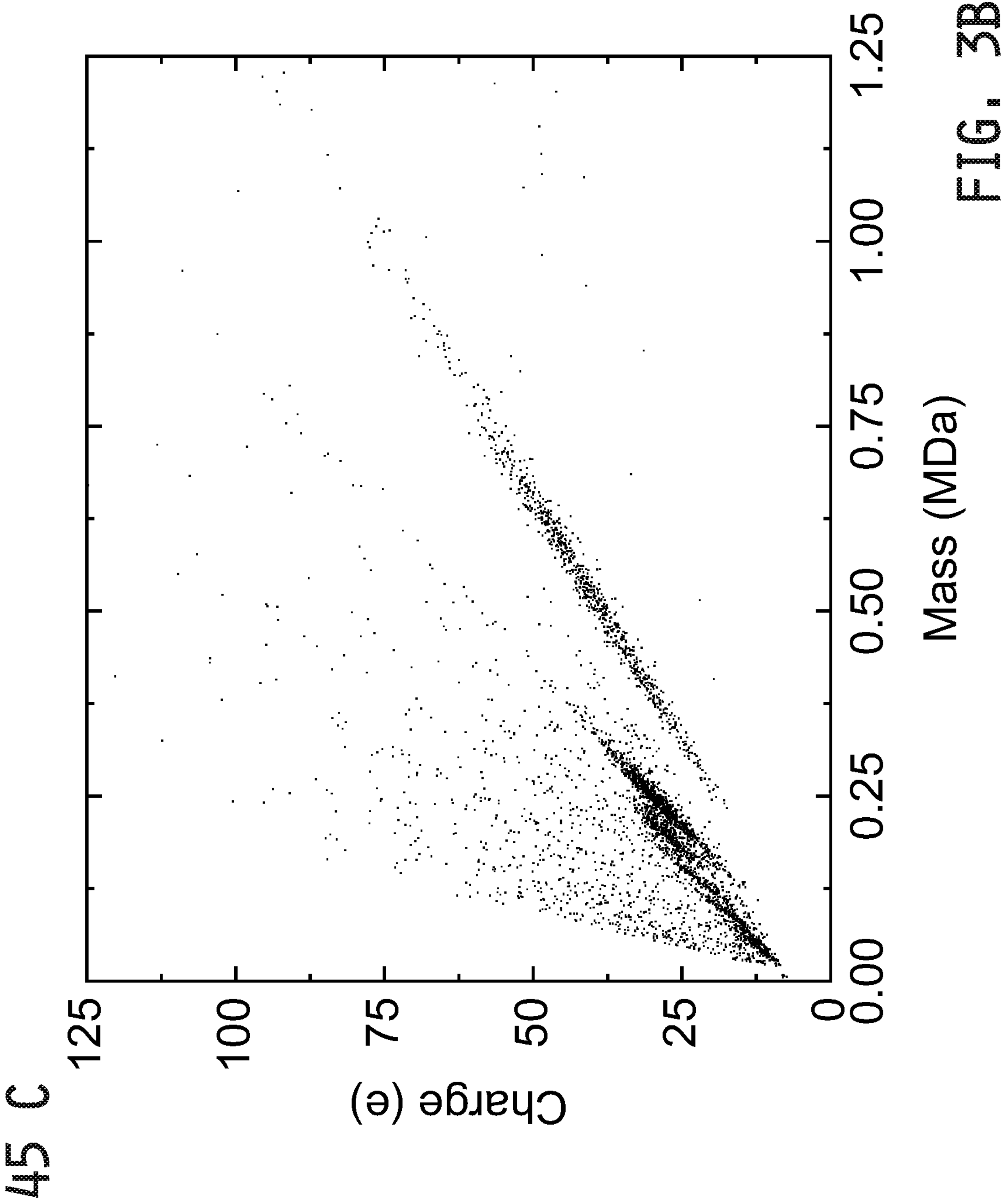
FIG. 3B is another example scatter plot similar to that of FIG. 3A for the same sample of human HDL at 45 degrees C., also generated according to the process illustrated in FIG. 2.
Figure 3C:
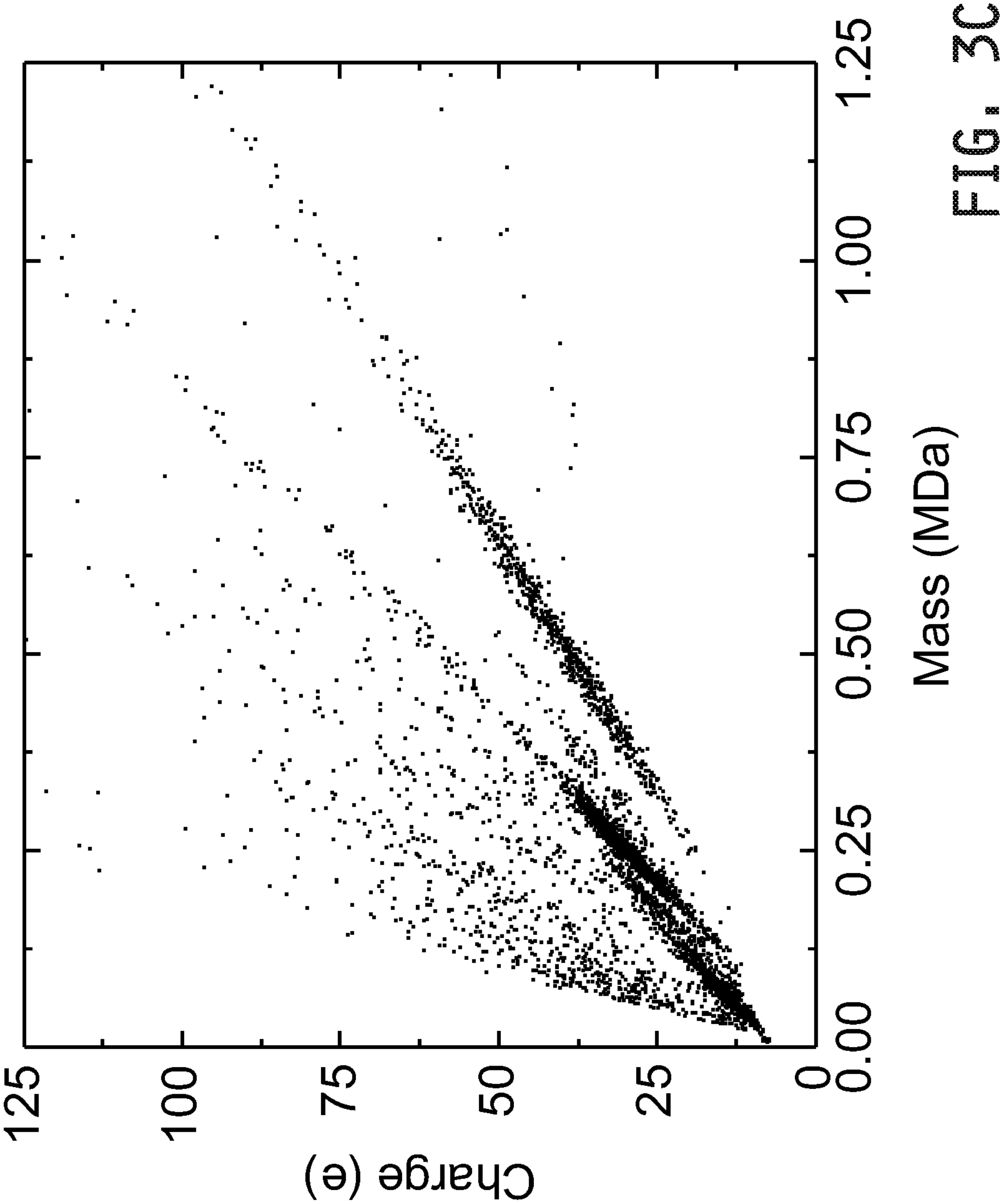
FIG. 3C is yet another example scatter plot similar to that of FIGS. 3A and 3B for the same sample of human HDL at 65 degrees C., also generated according to the process illustrated in FIG. 2.
Figure 3D:
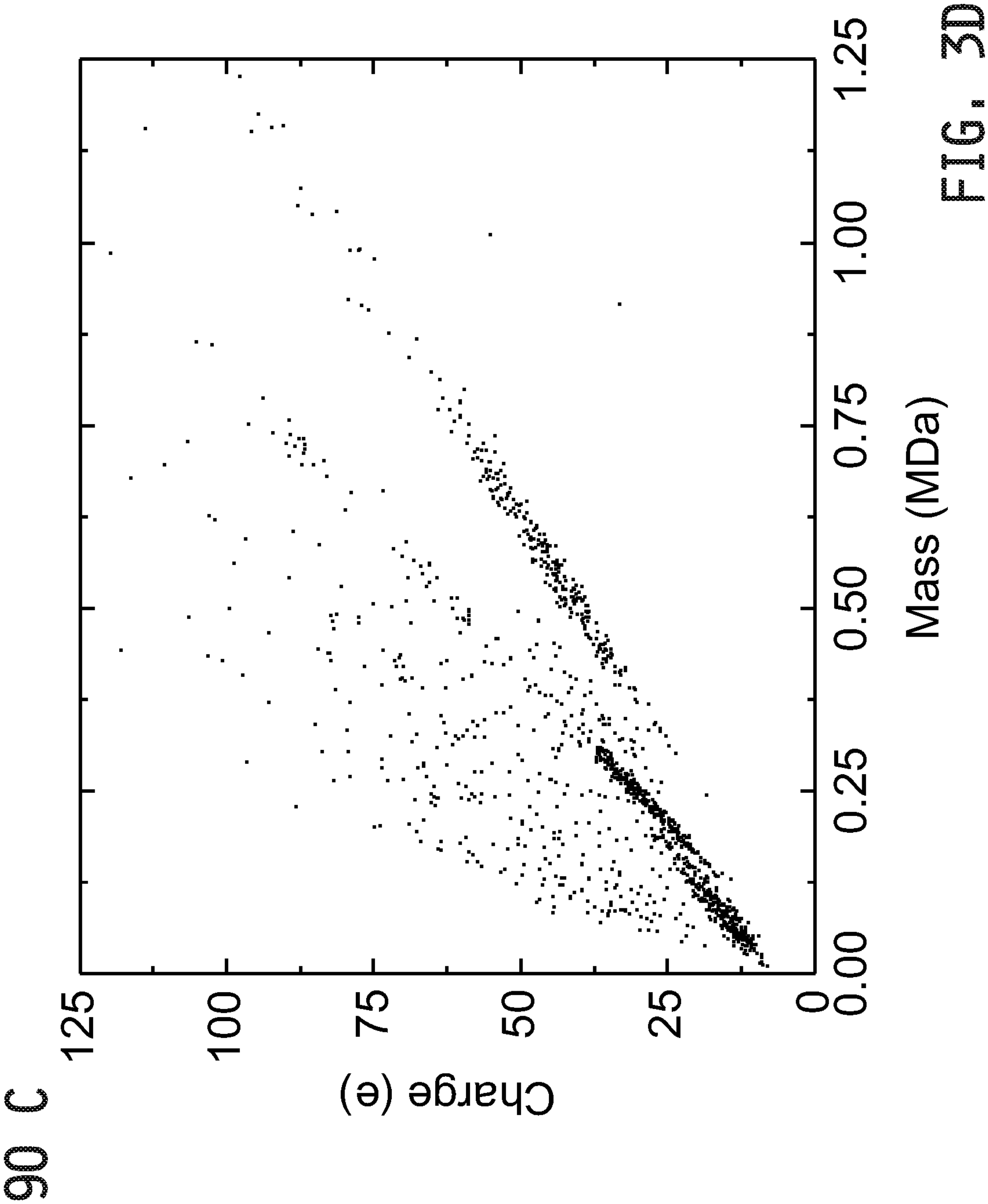
FIG. 3D is still another example scatter plot similar to that of FIGS. 3A-3C for the same sample of human HDL at 90 degrees C., also generated according to the process illustrated in FIG. 2.

Referring to FIGS. 3A-3D, four examples of steps 52-72 of the process 50 are shown in the form of scatter plots of particle charge magnitude (in units of elementary charge e) vs. particle mass (in units of mega-daltons MDa) of a sample 18 of HDL (high density lipoproteins) from which charged particles were generated by an ESI source and measured by a mass spectrometer 14 implemented in the form of a single-particle processing CDMS instrument. In these examples, the thermal energy source 24 was implemented in the form of a conventional heating device coupled to the sample 18 in solution. In FIG. 3A, the scatter plot was generated from charged particles measured at 25 degrees C., and the scatter plots of FIGS. 3B, 3C and 3D were generated from charged particles measured at 45 degrees C., 65 degrees C. and 90 degrees C. respectively. It will be understood that while the particles illustrated in FIGS. 3A-3D have masses in the MDa range, nothing in this disclosure should be understood as limiting the sample 18 to mixtures, solutions or substances made up of particles only in this mass range. Rather, it should be understood that the concepts described herein are applicable to mixtures, solutions and substances made up of particles in any mass range. Likewise, it should be understood that the sample 18 is not limited to the example HDL sample but may instead be a sample of any material, in any form, without limitation.

Figure 4:
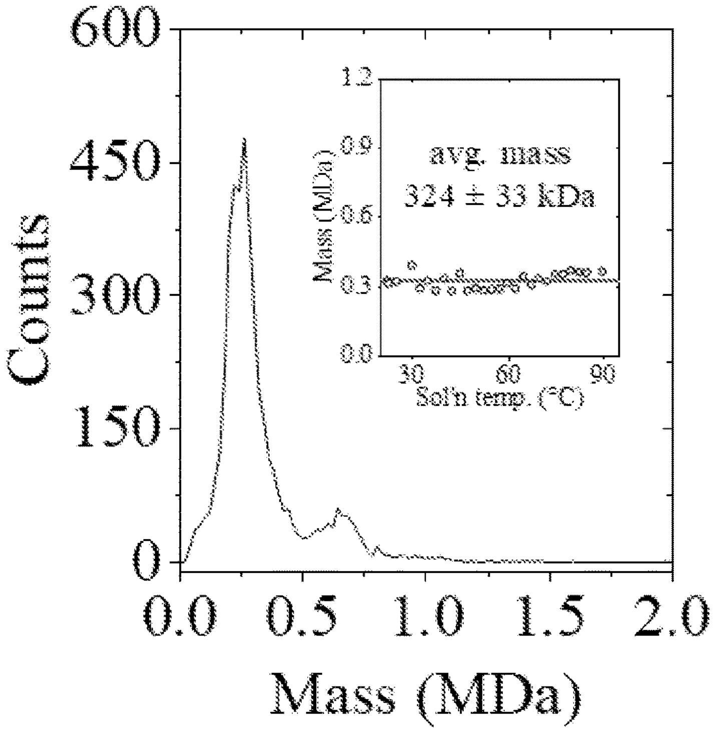
FIG. 4 is a plot of particle mass illustrating the mass spectra of the HDL data of FIG. 3A, along with an inset illustrating a relatively constant average mass of the sample particles over the temperature range of FIGS. 3A-3D.

From the plots illustrated in FIGS. 3A-3D, the data appears to disperse with increasing temperature. However, as illustrated in FIG. 4, the average mass of the sample 18 of HDL does not appear to deviate significantly from the average mass value of 324 kDa over the temperature range 25 degrees C.-90 degrees C. As such, the dispersion of the data illustrated in FIGS. 3A-3D is attributable to temperature-dependent changes in the charge magnitudes of the charged particles generated from the sample 18. In this regard, the process 50 of FIG. 2 advances from the YES branch of step 70 to step 74 where the processor 20 is operable to process the particle mass and charge measurements taken at the various different temperatures T(1)-T(S) to determine particle charge-related information.

Figure 5:
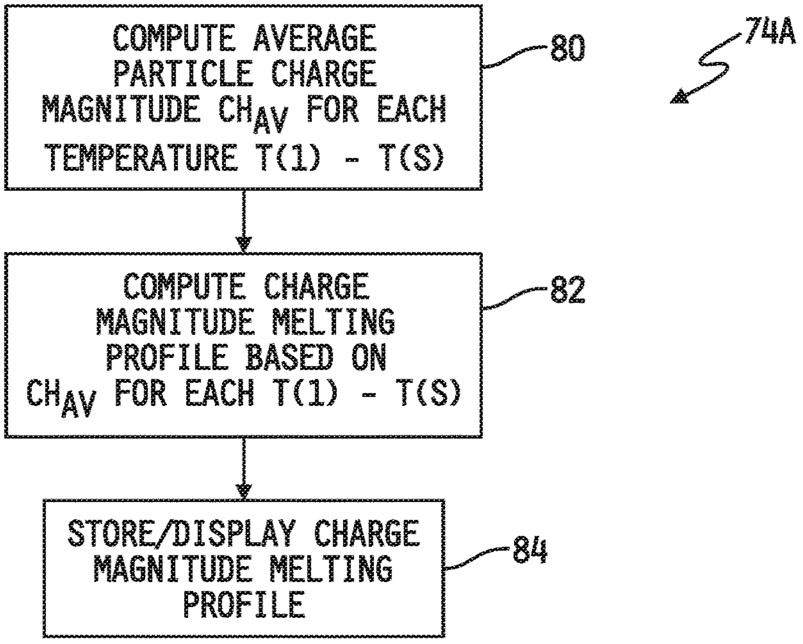
FIG. 5 is a simplified flowchart of an embodiment of a process for executing the final step of the process illustrated in FIG. 2.

Referring now to FIG. 5, a simplified flowchart is shown of an embodiment of a process 74A for executing step 74 of the process 50 illustrated in FIG. 2. The process 74A is illustratively stored in the memory 22 in the form of instructions executable by the processor 20 to carry out processing of the particle mass and charge measurements taken at the various different temperatures T(1)-T(S) to determine particle charge-related information in the form of a charge melting profile of the sample 18 over the temperature range T(1)-T(S). The process 74A begins at step 80 where the processor 20 is operable to compute an average particle charge magnitude $CH_{AV}$ for each temperature in the temperature range T(1)-T(S) at which charged particles were generated and measured by the instrument 10 in the process 50 of FIG. 2. In one embodiment, the processor 20 is operable at step 80 to compute the average particle charge magnitude $CH_{AV}$ at each such temperature as an algebraic average of the measured charge magnitudes. In other embodiments, the processor 20 may be operable to compute such averages using one or more alternate averaging techniques. Keeping with the example described above with respect to FIGS. 3A-3D, the processor 20 is illustratively operable in this example at step 80 to compute $CH_{AV}$ for each temperature in increments of 5 degrees C. between 25 degrees C. and 90 degrees C.

Following step 80, the processor 20 is operable at step 82 to compute an average charge magnitude melting profile over the temperature range T(1)-T(S) based on the average charge magnitudes $CH_{AV}$ computed at step 80 for each temperature in the temperature range T(1)-T(S). Thereafter at step 84, the processor 20 is operable to store the average charge magnitude melting profile computed at step 82 and, in some embodiment, to display the same. Again referring to the example described above with respect to FIGS. 3A-3D, an average charge melting profile thereof is illustrated by example in FIG. 6. As evident from FIG. 6, the particle charge magnitudes of the HDL sample 18 exhibit a relatively constant average charge value of around 35 e for temperatures below about 60 degrees C., and then undergo a melting transition centered at about 66 degrees C., and at temperatures above about 75 degrees C. the particle charge magnitudes of the HDL sample 18 exhibit a relatively constant average charge value of around 42 e.

Figure 7:
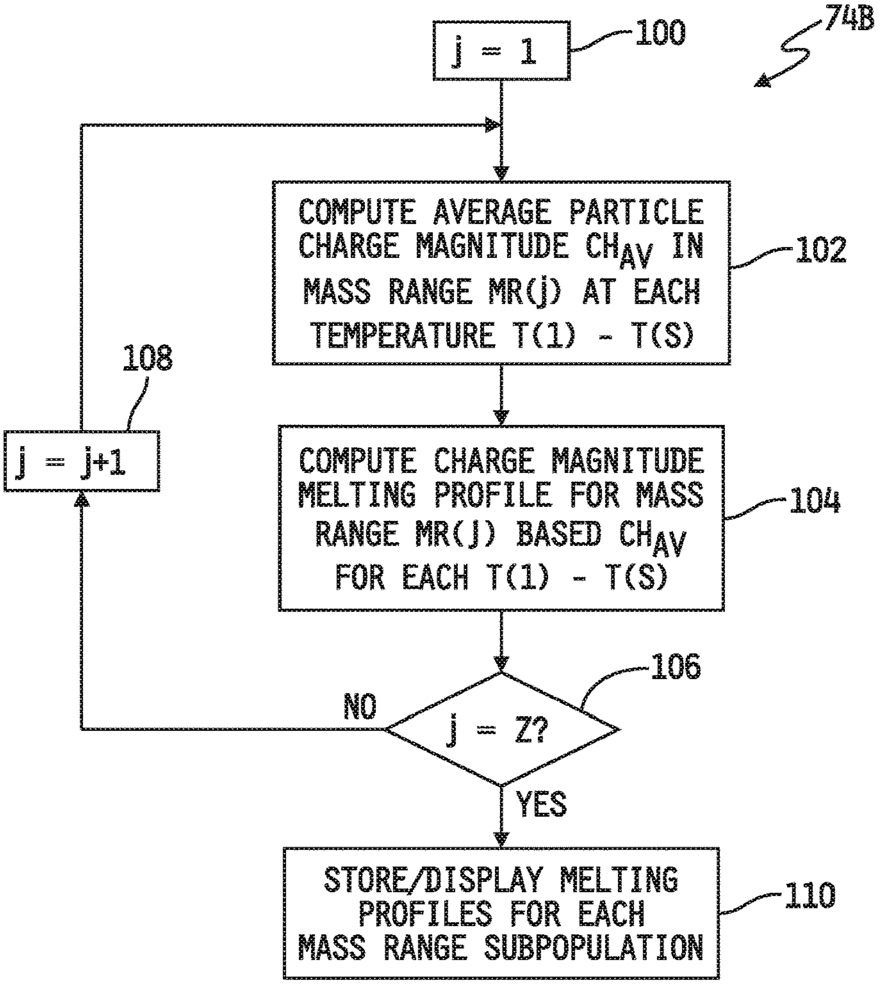
FIG. 7 is a simplified flowchart of an embodiment of another process for executing the final step of the process illustrated in FIG. 2.
Figure 8A:
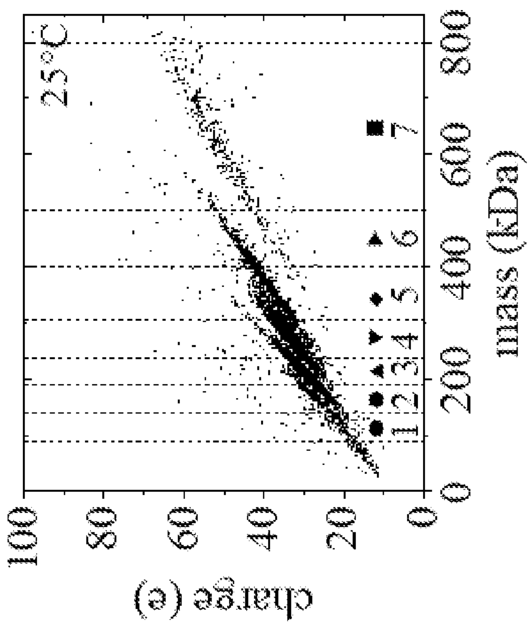
FIG. 8A is a reproduction of the scatter plot of FIG. 3A partitioned into a plurality of different mass subpopulations or ranges.
Figure 8B:
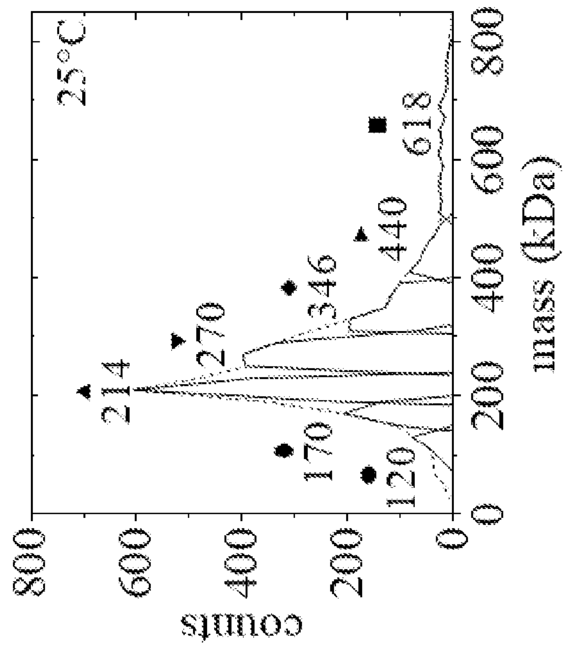
FIG. 8B is a plot of particle mass illustrating the contributions of the different mass subpopulations of FIG. 8A to the overall mass spectrum of the HDL data illustrated in FIG. 8A.

Referring now to FIG. 7, a simplified flowchart is shown of an embodiment of another process 74B for executing step 74 of the process 50 illustrated in FIG. 2. The process 74B is illustratively stored in the memory 22 in the form of instructions executable by the processor 20 to carry out processing of the particle mass and charge measurements taken at the various different temperatures T(1)-T(S) to determine particle charge-related information in the form of charge melting profiles for subpopulations of particles in each of multiple different mass ranges of the sample 18 over the temperature range T(1)-T(S). Referring to FIG. 8A, for example, the plot of FIG. 4A is reproduced upon which several vertical dashed lines are superimposed illustrating partitioning of the charge magnitude vs. mass measurements into seven different, side-by-side mass ranges. In FIG. 8B, a mass abundance spectrum is shown of the partitioned mass ranges depicting the average mass values of the particles in each mass range. In the illustrated example, the average mass value of the particles in mass range 1 is 120 kDa, the average mass value of the particles in mass range 2 is 170 kDa, and the average mass values of the particles in mass ranges 3 through 7 are 214, 270, 346, 440 and 618 kDa respectively. According to the process 74B illustrated in FIG. 7, the processor 20 is operable to process the particle mass and charge measurements taken at the various different temperatures T(1)-T(S) to determine charge melting profiles the subpopulations of particles in each of the multiple different mass ranges of the sample 18 over the temperature range T(1)-T(S). The process 74B begins at step 100 where the processor 20 is operable to set a counter j equal to 1 or to some other constant. Thereafter at step 102, the processor 20 is operable to compute an average particle charge magnitude $CH_{AV}$, using any conventional averaging technique, for each of the particles within the mass range MR(j) of the charged particles in each temperature range T(1)-T(S) at which charged particles were generated and measured by the instrument 10 in the process 50 of FIG. 2. Thereafter at step 104, the processor 20 is operable to compute an average charge magnitude melting profile for the mass range MR(j) based on the average charge magnitudes $CH_{AV}$ computed at step 102 for each temperature in the temperature range T(1)-T(S). Thereafter at step 106, the processor 20 is operable to determine whether the count value j has reached a count value Z equal to the total number of partitioned mass ranges. If not, the process 74B advances to step 108 where the processor 20 increments the counter j before looping back to step 102. If, at step 106, j=Z, the process 74B advances to step 110 where the processor 20 is operable to store the average charge magnitude melting profiles computed at step 104 and, in some embodiment, to display the same. Referring to the example described above with respect to FIGS. 8A and 8B, average charge melting profiles of the charged particles in each of the seven mass ranges are illustrated by example in FIG. 8C. Each mass range has a separate and distinct average charge melting profile, and each has a different average melting temperature; e.g., 59 degrees C. for mass range 1, 62 degrees C. for mass range 2, etc.

Figure 9:
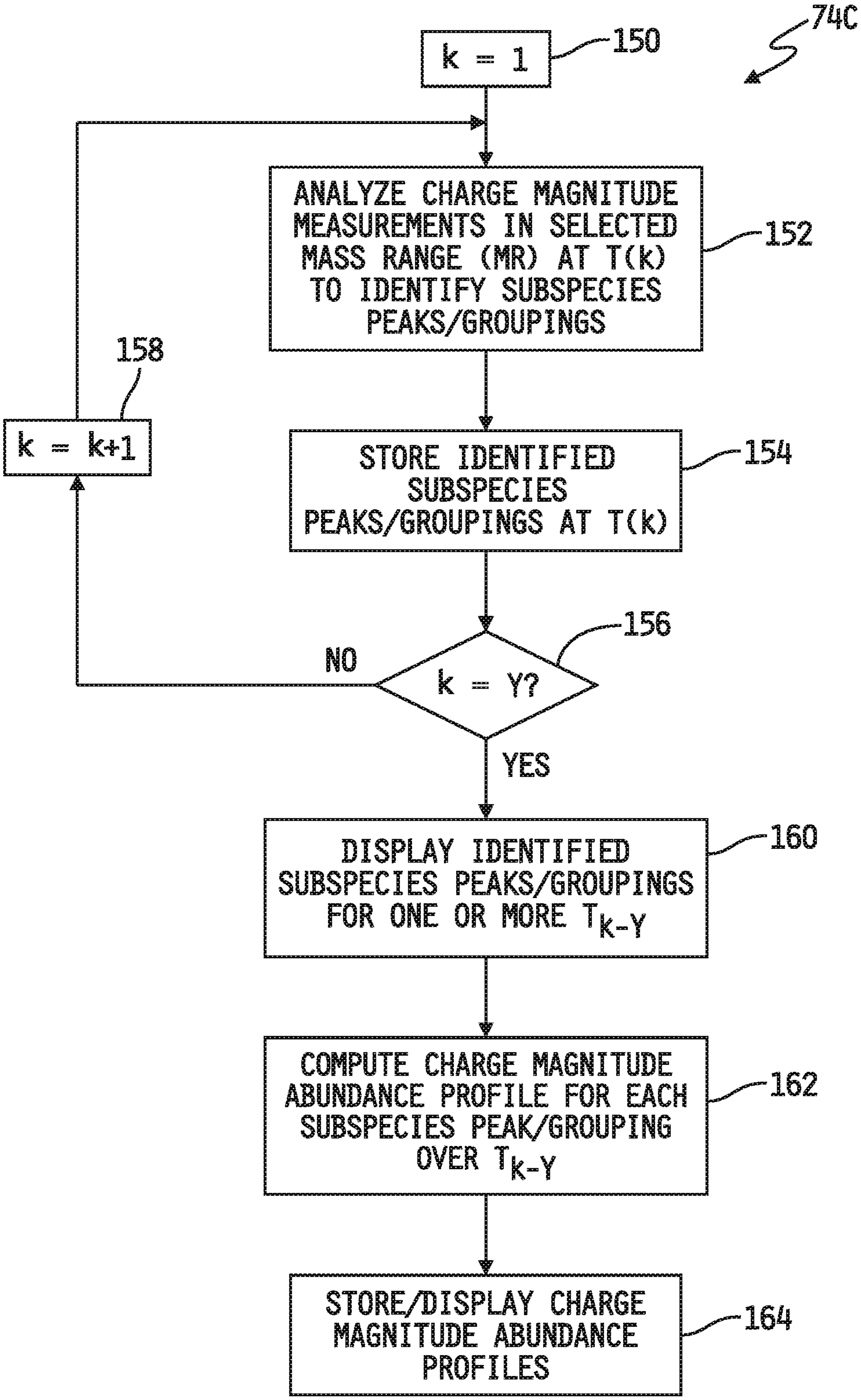
FIG. 9 is a simplified flowchart of an embodiment of yet another process for executing the final step of the process illustrated in FIG. 2.

Referring now to FIG. 9, a simplified flowchart is shown of an embodiment of yet another process 74C for executing step 74 of the process 50 illustrated in FIG. 2. The process 74C is illustratively stored in the memory 22 in the form of instructions executable by the processor 20 to carry out processing of the particle mass and charge measurements taken at the various different temperatures T(1)-T(S) to determine particle charge-related information in the form of newly observed families of structures for subpopulations of particles in different mass ranges of the sample 18 over the temperature range T(1-T(S). In accordance with the process 74C, the particle mass and charge measurements taken at the various different temperatures T(1-T(S) are processed within each mass range subpopulation as a function of temperature to identify additional subspecies, if any, via detectable peaks or groupings. The process 74C begins at step 150 where the processor 20 is operable to set a counter k equal to one or some other constant. Thereafter at step 152, the processor 20 is operable to analyze the charge magnitude measurements in a selected mass range at one of the temperatures T(k) at which the charged particles were measured by the instrument 10 to identify any new subspecies, if any, via detectable peaks or groupings. At step 154, the processor 20 is operable to store any subspecies peaks or groupings identified at the temperature T(k). Thereafter at step 156, the processor 20 is operable to determine whether the current value of the counter k is equal to a temperature count value Y. If not, the process 74C advances to step 158 where the processor 20 increments the value of k before looping back to step 152, and otherwise the process 74C advances to step 160.

At step 160, the processor 20 is illustratively operable to display the identified subspecies peaks/groupings for one or more of the temperatures $T_k$-$T_Y$. Thereafter at step 162, the processor 20 is illustratively operable to compute charge magnitude abundance profiles for each such subspecies peak/grouping over the temperature range $T_k$-$T_Y$. Thereafter at step 164, the processor 20 is illustratively operable to store the results of the previous steps and, in some embodiments, to display the charge magnitude abundance profiles.

In some embodiments, the processor 20 may be operable to execute step 152 by analyzing only the charge magnitude measurements within the selected mass range subpopulation, although in other embodiments it may be useful to analyze abundance peaks of the measurements converted to mass-to-charge ratio values. The latter case is illustrated by an example execution of step 160 of the process 74C in FIG. 10A which depicts abundance vs. mass-to-charge ratio plots of the subpopulation of the charged particles in mass range 7 of FIGS. 8A-8C as a function of temperature. As the temperature of the subpopulation of charged particles in mass range 7 increases, well-defined, high charge state subspecies emerge in the mass-to-charge ratio spectrum. At 25 degrees C., for example, a single z=45 e peak is observed at a mass-to-charge ratio (m/z) of approximately 13 kTh. As the temperature is increased to 55 degrees C., the fraction of 13 kTh particles decreases which results in a shift of the m/z peak to approximately 12.5 kTh and a new subspecies is observed with a z=56 e peak. As the masses of these particles have not changed, as described above with respect to FIG. 4, the newly observed subspecies correspond to changes in the average charge of the particles. As the temperature is further increased to 65° C. the z=56 e subspecies increases in abundance and additional subspecies emerges with z=73 e, z=81 e and Z=106 e respectively. At another increased solution temperature of 75° C. yet another subspecies emerges with z=123. In total the z=45 e precursor gives rise to at least five new resolvable subspecies.

Figure 10A:
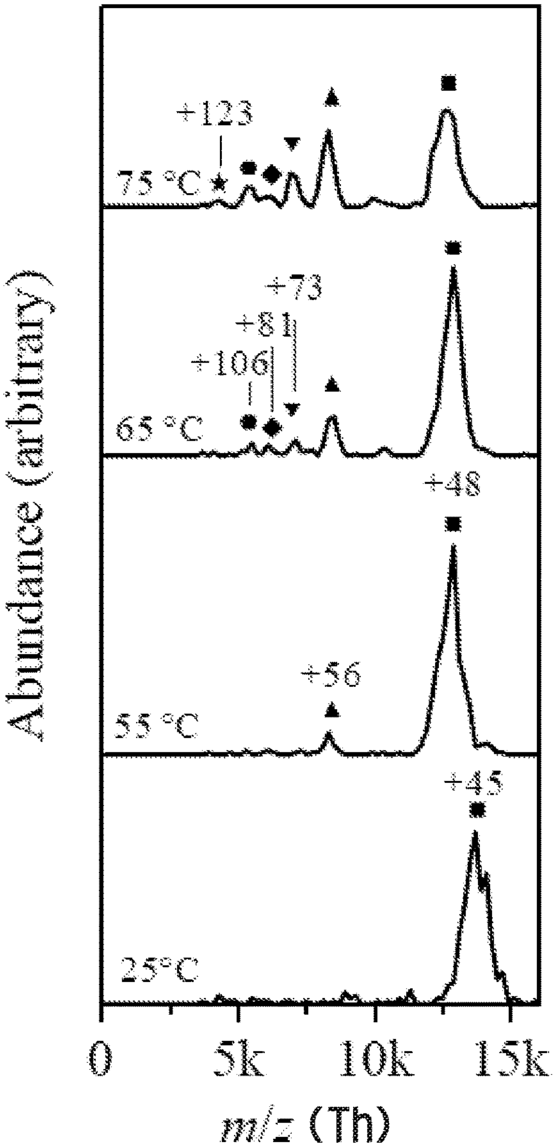
FIG. 10A is a plot of abundance vs. mass-to-charge ratio of mass range number 7 of FIGS. 8A-8C at a number of different temperatures, produced according to the process illustrated in FIG. 9.
Figure 10B:
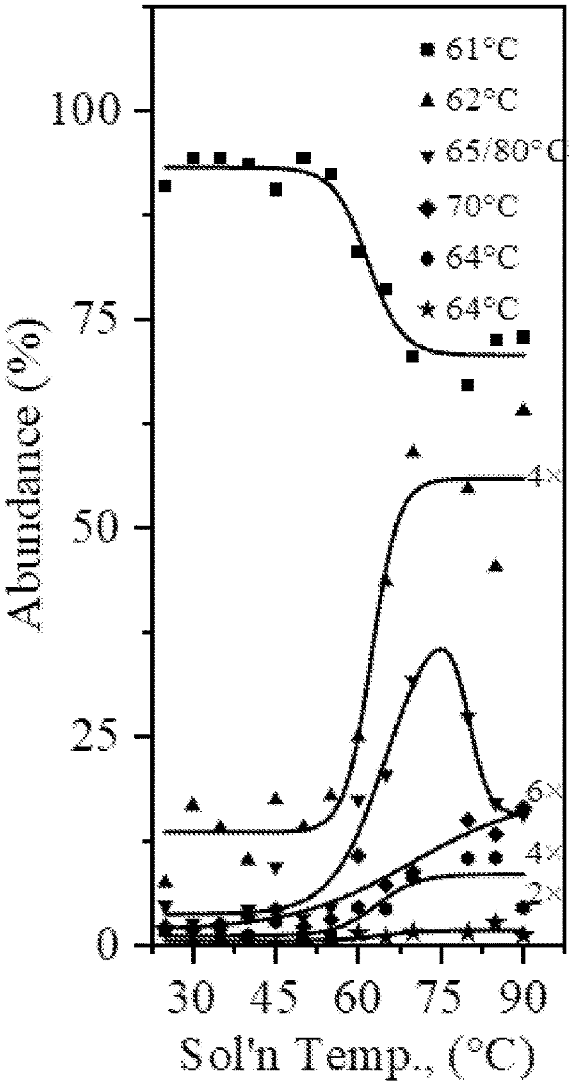
FIG. 10B is a plot of charge abundance vs temperature illustrating charge abundance profiles of the subspecies illustrated in FIG. 10A, produced according to the process illustrated in FIG. 9.

An example of steps 162 and 164 of the process 74C is illustrated in FIG. 10B which depicts a plot of the charge magnitude abundance profiles of the subspecies illustrated in FIG. 10A as a function of temperature. The top curve in FIG. 10B is the precursor charge state, and the bottom five curves in FIG. 10B correspond to the five new subspecies identified at steps 152-158 and illustrated by example in FIG. 10A. The plot of FIG. 10B reveals that each subspecies observed in FIG. 10A has a unique formation temperature, and that approximately 45% of subpopulation 7, i.e., mass range 7, is a subspecies that does not appear to melt, even at the highest temperature of approximately 90 degrees C. The remaining subpopulations behave similarly—providing evidence for as few as three, to as many as six subspecies, within each subpopulation. Each subspecies is delineated based on its charge and unique formation temperature. In total, the 7 subpopulations, i.e., 7 mass ranges illustrated in FIGS. 8A and 8B, evolve into 28 unique subspecies. In every case, subspecies that are discernable at elevated temperatures disappear upon cooling the solution, regenerating the seven initial subpopulations. That is, each transition is reversible, although in some instances not all transitions may be reversible. The new high temperature subspecies arise when distinct subspecies that are present, but unresolved and therefore hidden at low temperatures, undergo unique melting transitions with increasing temperatures that enable them to be resolved.

Figure 6:
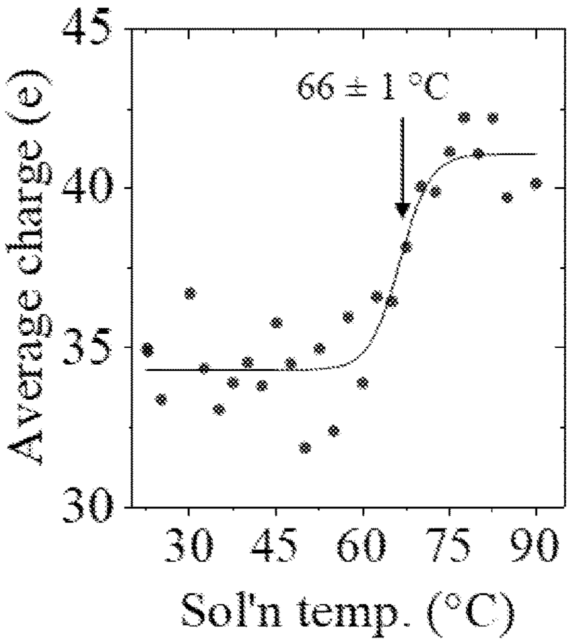
FIG. 6 is a plot of average charge magnitude vs. temperature produced according to the process illustrated in FIG. 5.
Figure 8C:
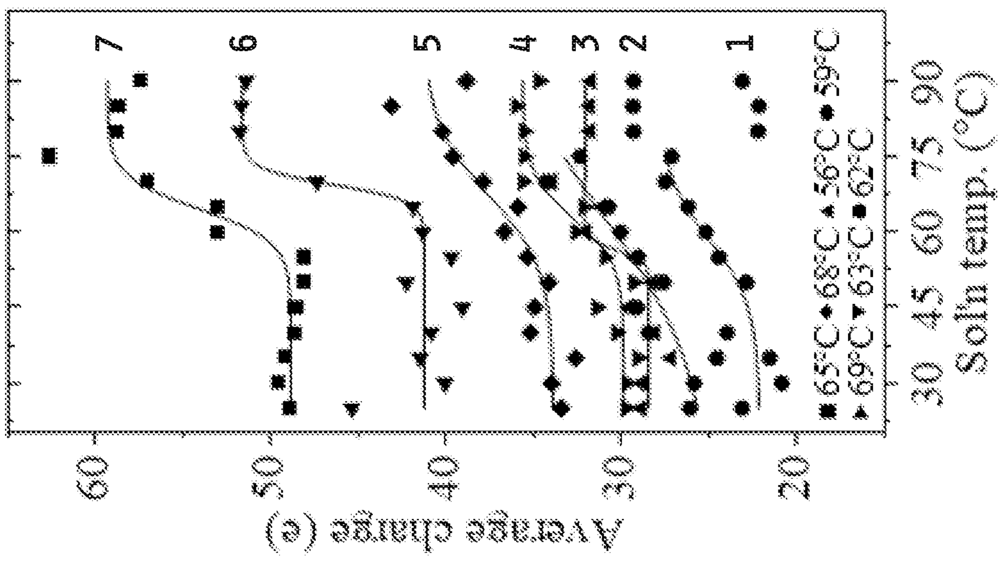
FIG. 8C is a plot of average charge magnitude vs. temperature for each of the plurality of mass subpopulations or ranges of FIG. 8A, produced according to the process illustrated in FIG. 7.

Average charge magnitude melting profiles of the types illustrated in FIGS. 6 and 8C for an HDL sample 18, as well as the emergence of additional high charge-state subspecies within mass-range subpopulations of particles as illustrated in FIGS. 10A and 10B for the same HDL sample 18, provide a useful measure of the stability of a sample over temperature. Temperature stability of particles is particularly useful in the investigation of biological substances, an example of which includes, but is not limited to, viruses, and particularly those used for gene therapy products. The temperature stabilities of gene therapy products may be related to the efficacy of such products, i.e., in terms of explaining why some gene therapy products are therapeutically active and others are not. Moreover, it will be understood that while the sample 18 used in the examples illustrated in FIGS. 3A-3D, 4, 6, 8A-8C and 10A-10B is a high density lipoprotein (HDL) sample, in other applications the sample 18 may be any material whether or not biological in nature and whether in solution or otherwise. Additional example biological substances or materials that may be used as the sample 18 may include, but are not limited to, exomes, endosomes, microvessicles generally, ectosomes, apoptotic bodies, gene therapies, retroviruses, exomeres, chylomicrons, DNA, RNA, proteins, fats, acids, carbohydrates, enzymes, viruses, bacteria, or the like.

As described at the outset, this disclosure relates to apparatuses and techniques for measuring particle charges of a sample over at least one range of differing physical and/or chemical conditions in which the sample particles undergo structural changes, and for analyzing the resulting measurements to identify new structural subspecies as a function of at least particle charge. In this regard, the processes illustrated in FIGS. 2, 5, 7 and 9, as well as the data illustrated in FIGS. 3A-3D, 4, 6, 8A-8C and 10A-10B, represent one example embodiment in which particle charges are measured over a range of changing temperatures, which illustratively span melting temperatures of the particles, via control of the thermal energy source 24 as depicted in FIGS. 2-4, and in which the measured charge data is thereafter analyzed according to the processes illustrated in FIGS. 5, 7 and 9 to produce the information illustrated in FIGS. 6, 8A-8C and 10A-10B.

In one alternate embodiment, the particle charges may be instead be measured over a range of changing instrument pressures via control of one or more of the pumps P1, P2, P3 depicted in FIG. 1. In this embodiment, step 56 of the process 50 illustrated in FIG. 2 will be modified to control P1, P2 and/or P3 to a target pressure P(i), and the pressure value(s) will then be incrementally changed at steps 70 and 72 until the sample particles have been subjected to a range of different pressure conditions in which the sample particles undergo structural changes. The process 74A illustrated in FIG. 5 will then be modified to compute an average particle charge magnitude for each pressure value, and to compute a charge magnitude pressure profile based on the average particle charge magnitude values over the pressure range. The processes 74B and 74C illustrated in FIGS. 7 and 9 respectively will likewise be modified to process the charge magnitude values at the various pressure values and in the various mass ranges.

In another alternate embodiment, the particle charges may be instead be measured over a range of changing sample compositions (i.e. changing sample content or makeup), with each one or more sample composition changes being carried out by adding one or more components to the sample 18, removing one or more components from the sample 18, changing the relative concentration of one or more components relative to one or more other components, or the like. In this embodiment, step 56 of the process 50 illustrated in FIG. 2 will be modified to carry out a change in the composition of the sample 18, and the sample composition will then be incrementally changed at steps 70 and 72 until the sample particles have been subjected to a range of different sample compositions in which the sample particles undergo structural changes. This may entail a single composition change or several composition changes. The process 74A illustrated in FIG. 5 will then be modified to compute an average particle charge magnitude for each sample composition, and to compute a charge magnitude pressure profile based on the average particle charge magnitude values over the range of sample compositions. The processes 74B and 74C illustrated in FIGS. 7 and 9 respectively will likewise be modified to process the charge magnitude values at the various sample compositions and in the various mass ranges.

In still another alternate embodiment, the particle charges may be instead be measured over reaction time range following a mixing together of two or more components to form, or alter, the sample 18. In this embodiment, step 56 of the process 50 illustrated in FIG. 2 will be modified to carry out a mixing together of two or more components to form the sample 18, or to carry out a mixing together of a component to an existing mixture, and the time from initial mixing or altering will then be incrementally changed at steps 70 and 72 until the sample particles undergo a structural change or structural changes. The time passage may be short or long, and may last until the resulting mixture reaches equilibrium or some state prior to equilibrium. This embodiment may entail a single initial mixture or a series of new mixtures following an initial mixture. The process 74A illustrated in FIG. 5 will then be modified to compute an average particle charge magnitude over time, and to compute a charge magnitude pressure profile based on the average particle charge magnitude values over the range of time of the chemical reaction. The processes 74B and 74C illustrated in FIGS. 7 and 9 respectively will likewise be modified to process the charge magnitude values at the chemical reaction time range(s) and in the various mass ranges. In still further alternate embodiments, any combination of changing sample temperature, changing sample pressure, changing sample composition and time of chemical reaction may be measured and processed each as described above.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected.

What is claimed is:

1. An instrument for analyzing charged particles, comprising:

an ion generator configured to generate charged particles from a sample of particles, a mass spectrometer configured to receive the charged particles generated by the ion generator and to measure masses and charge magnitudes of the generated charged particles, a thermal energy source configured to transfer thermal energy to at least one of the sample particles and the charged particles generated by the ion generator, a processor, and a memory having instructions stored therein executable by the processor to cause the processor to (a) control the thermal energy source to cause the charged particles to enter the mass spectrometer at each of a plurality of different temperatures within a range of temperatures over which the sample particles undergo structural changes, (b) control the mass spectrometer to measure at least the charge magnitudes of the generated charged particles at each of the plurality of different temperatures, (c) determine an average charge magnitude of the generated charged particles at each of the plurality of different temperatures based on the measured charge magnitudes, and (d) determine an average charge magnitude profile over the range of temperatures based on the determined average charge magnitudes.

2. The instrument of claim 1, wherein the instructions stored in the memory further include instructions executable by the processor to cause the processor to control the mass spectrometer to measure the masses of the generated charged particles at each of the plurality of different temperatures, to determine the average charge magnitude of the generated charged particles by determining an average charge magnitude of the generated particles at each of the plurality of temperatures within a selected particle mass range based on the measured masses and the measured charge magnitudes, and to determine the average charge magnitude profile by determining an average charge magnitude profile over the range of temperatures within the selected mass range based on the determined average charge magnitudes within the selected mass range.

3. The instrument of claim 1, wherein the thermal energy source is coupled to the sample and is configured to transfer thermal energy to the sample prior to generation of charged particles by the ion generator.

4. The instrument of claim 3, wherein the ion generator is an electrospray ion source and the sample is in solution.

5. The instrument of claim 3, wherein the instructions stored in the memory include instructions executable by the processor to control the thermal energy source to cause the charged particles to enter the mass spectrometer at each of the plurality of different temperatures by controlling the thermal energy transferred by the thermal energy source to the sample particles prior to ionization thereof.

6. The instrument of claim 1, wherein the thermal energy source is positioned to transfer the thermal energy to the charged particles generated by the ion generator.

7. The instrument of claim 5, wherein the ion generator is an electrospray ion source and the sample is in solution.

8. The instrument of claim 6, wherein the instructions stored in the memory include instructions executable by the processor to control the thermal energy source to cause the charged particles to enter the mass spectrometer at each of the plurality of different temperatures by controlling the thermal energy transferred by the thermal energy source to the charged particles following ionization thereof.

9. The instrument of claim 1, wherein the mass spectrometer is a charge detection mass spectrometer.

10. The instrument of claim 1, wherein the instructions stored in the memory include instructions executable by the processor to control the thermal energy source to cause the charged particles generated by the ion generator to enter the mass spectrometer at each of a plurality of different temperatures that span melting temperatures of the sample particles.

11. An instrument for analyzing charged particles, comprising:

an ion generator configured to generate charged particles from a sample of particles, a mass spectrometer configured to receive the charged particles generated by the ion generator and to measure masses and charge magnitudes of the generated charged particles, a thermal energy source configured to transfer thermal energy to at least one of the sample particles and the charged particles generated by the ion generator, a processor, and a memory having instructions stored therein executable by the processor to cause the processor to (a) control the thermal energy source to cause the charged particles to enter the mass spectrometer at each of a plurality of different temperatures within a range of temperatures over which the sample particles undergo structural changes, (b) control the mass spectrometer to measure the masses and charge magnitudes of the generated charged particles at each of the plurality of different temperatures, and (c) within a selected range of the measured masses, (i) identify all charge magnitude peaks of the measured charge magnitudes at a first one of the plurality of temperatures, and (ii) identify additional charge magnitudes of the measured charge magnitudes at each of one or more additional ones of the plurality of temperatures each having a higher temperature than that of the first one of the plurality of temperatures.

12. The instrument of claim 11, wherein the instructions stored in the memory further include instructions executable by the processor to cause the processor to execute (c)(i) with the first one of the plurality of temperatures selected to be a lowest one of the plurality of temperatures.

13. The instrument of claim 11, wherein the thermal energy source is coupled to the sample and is configured to transfer thermal energy to the sample prior to generation of charged particles by the ion generator.

14. The instrument of claim 11, wherein the ion generator is an electrospray ion source and the sample is in solution.

15. The instrument of claim 11, wherein the thermal energy source is positioned to transfer the thermal energy to the charged particles generated by the ion generator.

16. The instrument of claim 15, wherein the ion generator is an electrospray ion source and the sample is in solution.

17. The instrument of claim 11, wherein the mass spectrometer is a charge detection mass spectrometer.

18. A method for analyzing charged particles, comprising:

in or into an ion source region, generating charged particles from a sample of particles, causing the charged particles to enter a mass spectrometer from the ion source region at each of a plurality of differing temperatures within a range of temperatures over which the sample particles undergo structural changes, controlling the mass spectrometer to measure at least the charge magnitudes of the generated charged particles at each of the plurality of differing temperatures, determining, with a processor, an average charge magnitude of the generated charged particles at each of the plurality of differing temperatures based on the measured charge magnitudes, and determining, with the processor, an average charge magnitude profile over the range of temperatures based on the determined average charge magnitudes.

19. The method of claim 18, wherein the range of temperatures spans melting temperatures of the sample particles.

20. The method of claim 18, wherein causing the charged particles to enter a mass spectrometer at each of a plurality of differing temperatures within a range of temperatures comprises selectively applying thermal energy from a source of thermal energy to the sample of particles or to the charged particles.

* * * * *